US012582172B2

(12) United States Patent
Mei et al.

(10) Patent No.: US 12,582,172 B2
(45) Date of Patent: Mar. 24, 2026

(54) LIQUID STORAGE ASSEMBLY, ELECTRONIC VAPORIZATION APPARATUS, AND REMAINING VOLUME DETECTION METHOD

(71) Applicant: SHENZHEN SMOORE TECHNOLOGY LIMITED, Shenzhen (CN)

(72) Inventors: Jiagang Mei, Shenzhen (CN); Yu Du, Shenzhen (CN); Tongfei Pan, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 701 days.

(21) Appl. No.: 18/052,340

(22) Filed: Nov. 3, 2022

(65) Prior Publication Data

US 2023/0135876 A1 May 4, 2023

(30) Foreign Application Priority Data

Nov. 4, 2021 (CN) .......................... 202111300731.4
Dec. 25, 2021 (CN) .......................... 202111605164.3

(51) Int. Cl.
*A24F 40/53* (2020.01)
*A24F 40/10* (2020.01)
(Continued)

(52) U.S. Cl.
CPC .............. *A24F 40/53* (2020.01); *A24F 40/10* (2020.01); *A24F 40/42* (2020.01); *G01F 22/00* (2013.01)

(58) Field of Classification Search
CPC .......... A24F 40/53; A24F 40/10; A24F 40/42; G01F 22/00
See application file for complete search history.

(56) References Cited

U.S. PATENT DOCUMENTS 11,944,125 B2 * 4/2024 Bilat ....................... A24F 40/65
2011/0083504 A1 4/2011 Unger
(Continued)

FOREIGN PATENT DOCUMENTS

CN 1534302 A 10/2004
CN 1595075 A 3/2005
(Continued)

OTHER PUBLICATIONS

Chinese Patent Office, Office Action in Chinese Patent Application No. 202111300731.4 (Sep. 13, 2023).
(Continued)

*Primary Examiner* — Stephanie E Bloss
*Assistant Examiner* — Diana Hancock
(74) *Attorney, Agent, or Firm* — Leydig, Voit & Mayer, Ltd.

(57) ABSTRACT

A liquid storage assembly includes: a liquid storage cavity for storing to-be-vaporized liquid; a reference element at least partially located in the liquid storage cavity and including a reference electrode; at least one detection element at least partially located in the liquid storage cavity, the at least one detection element being spaced apart from the reference element and including a detection electrode; and a detection circuit electrically connected to the reference element and the at least one detection element, the detection circuit detecting capacitance between the reference element and the at least one detection element or resistance of the to-be-vaporized liquid, and determining a remaining volume of the to-be-vaporized liquid according to the detected capacitance or resistance.

17 Claims, 12 Drawing Sheets

(51) Int. Cl.
     *A24F 40/42*          (2020.01)
     *G01F 22/00*          (2006.01)

(56)                References Cited

U.S. PATENT DOCUMENTS

| | | | | |
|---|---|---|---|---|
| 2017/0071255 A1* | 3/2017 | Revell | | A24F 40/51 |
| 2019/0269176 A1* | 9/2019 | Dahlmann | | A24F 40/51 |
| 2020/0367568 A1* | 11/2020 | Lim | | G01R 27/26 |
| 2021/0186100 A1 | 6/2021 | Trieu et al. | | |
| 2025/0060259 A1* | 2/2025 | Atkins | | A24F 40/51 |

FOREIGN PATENT DOCUMENTS

| | | | |
|---|---|---|---|
| CN | 102535112 A | 7/2012 |
| CN | 104535135 A | 4/2015 |
| CN | 205068033 U | 3/2016 |
| CN | 107156911 A | 9/2017 |
| CN | 105517456 B | 6/2018 |
| CN | 208155403 U | 11/2018 |
| CN | 110487848 A | 11/2019 |
| CN | 110613176 A | 12/2019 |
| CN | 110710712 A | 1/2020 |
| CN | 107249360 B | 4/2020 |
| CN | 111418900 A | 7/2020 |
| CN | 210981427 U | 7/2020 |
| CN | 111588094 A | 8/2020 |
| CN | 111759016 A | 10/2020 |
| CN | 112056635 A | 12/2020 |
| CN | 213128009 U | 5/2021 |
| CN | 113030604 A | 6/2021 |
| CN | 213639671 U | 7/2021 |
| CN | 215179857 U | 12/2021 |

OTHER PUBLICATIONS

Chinese Patent Office, Office Action in Chinese Patent Application No. 202111605164.3 (Feb. 1, 2024).
Chinese Patent Office, Notification to Grant Patent Right for Invention in Chinese Patent Application No. 202111300731.4 (Jan. 19, 2024).
European Patent Office, Search Report in European Patent Application No. 22205481.9 (Apr. 11, 2023).
Chinese Patent Office, Office Action in Chinese Patent Application No. 202111300731.4 (Mar. 29, 2023).
Chinese Patent Office, Office Action in Chinese Patent Application No. 202111605164.3 (Jun. 1, 2023).

* cited by examiner

Electrical signal acquisition module — 710

To-be-vaporized liquid remaining volume determining module

720

First remaining volume determining unit — 721

Second remaining volume determining unit

722

Third remaining volume determining unit — 723

1000

3000

1000

2000

5000

1000

4000

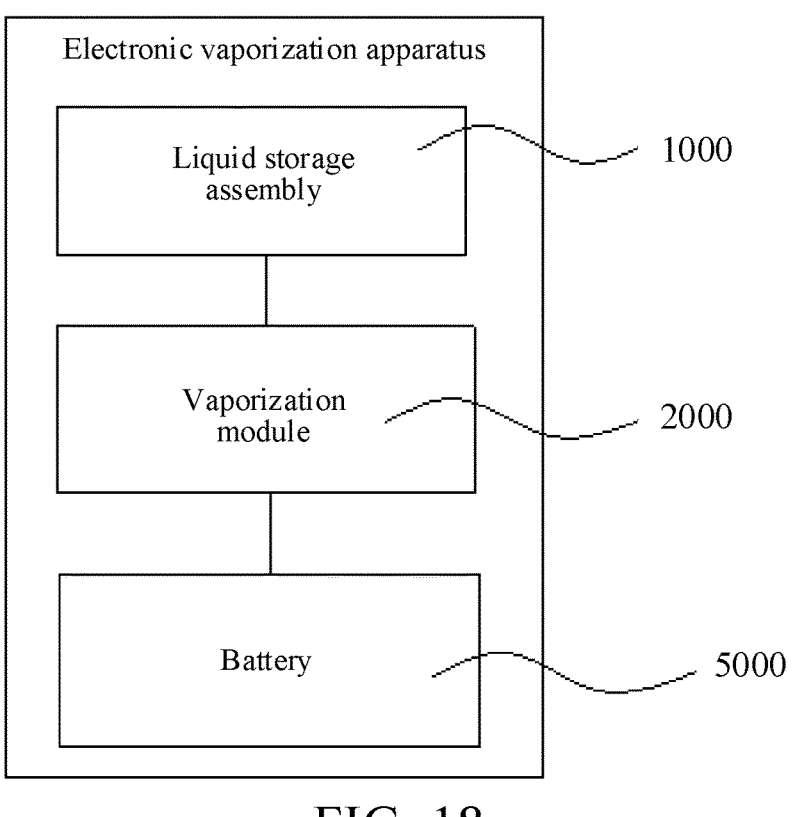

FIG. 18

Acquire a first electrical signal of a first conductive port, and acquire a second electrical signal of a second conductive port ⌐ S21

Determine a first resistance value of the to-be-vaporized liquid according to the first electrical signal, and determine a second resistance value of the to-be-vaporized liquid according to the second electrical signal ⌐ S22

Determine a remaining volume of the to-be-vaporized liquid according to the first resistance value and the second resistance value ⌐ S23

FIG. 19

LIQUID STORAGE ASSEMBLY, ELECTRONIC VAPORIZATION APPARATUS, AND REMAINING VOLUME DETECTION METHOD

CROSS-REFERENCE TO PRIOR APPLICATION

Priority is claimed to Chinese Patent Application No. 202111300731.4, filed on Nov. 4, 2021, and 202111605164.3, filed on Dec. 25, 2021, the entire disclosures of which are hereby incorporated by reference herein.

FIELD

The present invention relates to the field of electronic vaporization technologies, and in particular, to a liquid storage assembly, an electronic vaporization apparatus, and a remaining volume detection method.

BACKGROUND

An electronic vaporization apparatus mainly includes a power supply module and a vaporizer. The vaporizer includes a housing component and a vaporization module. The housing component may be sleeved outside the vaporization module and configured to form a liquid storage cavity. In order to prevent the generation of harmful substances and burnt smell, it is necessary to prevent the electronic vaporization apparatus from dry burning. However, an existing electronic vaporization apparatus cannot accurately acquire a remaining volume of to-be-vaporized liquid in a liquid storage cavity, which may easily cause dry burning of the electronic vaporization apparatus because the to-be-vaporized liquid in the liquid storage cavity has been exhausted but the electronic vaporization apparatus still continues to be used.

In existing methods for detecting a remaining volume of to-be-vaporized liquid, a method for detecting a remaining volume through a sensor is complex in design, and a method for detecting a remaining volume through a heating wire is too high in cost for a required material of the heating wire. In addition, the existing methods for detecting the remaining volume of the to-be-vaporized liquid are not accurate enough, and a detection result is likely to cause an erroneous determination.

SUMMARY

In an embodiment, the present invention provides a liquid storage assembly, comprising: a liquid storage cavity configured to store to-be-vaporized liquid; a reference element at least partially located in the liquid storage cavity and comprising a reference electrode; at least one detection element at least partially located in the liquid storage cavity, the at least one detection element being spaced apart from the reference element and comprising a detection electrode; and a detection circuit electrically connected to the reference element and the at least one detection element, the detection circuit being configured to detect capacitance between the reference element and the at least one detection element or resistance of the to-be-vaporized liquid, and to determine a remaining volume of the to-be-vaporized liquid according to the detected capacitance or resistance.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following:

FIG. 18 is a block diagram of function modules of an electronic vaporization apparatus according to the second example of the present invention; and FIG. 19 is a schematic flowchart of a remaining volume detection method for to-be-vaporized liquid according to the second example of the present invention.

DETAILED DESCRIPTION

Figure 1:
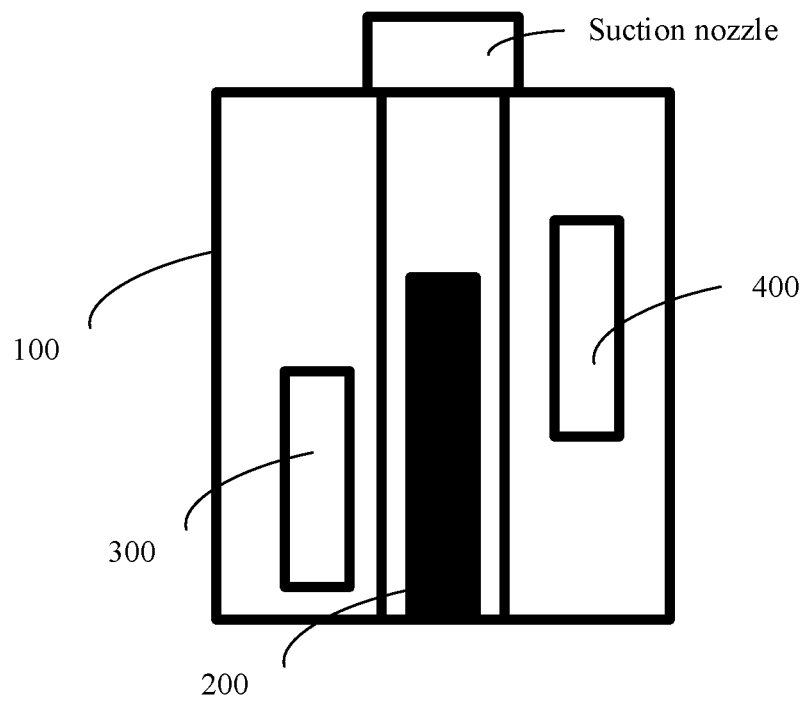
FIG. 1 is a schematic structural diagram of an electronic vaporization apparatus according to a first example of the present invention.

In an embodiment, the present invention provides a liquid storage assembly, an electronic vaporization apparatus, and a remaining volume detection method provided by the present invention solve the problems that detection of a remaining volume of to-be-vaporized liquid is complex in design and high in cost, and a detection result is likely to cause an erroneous determination.

According to a first aspect of the present invention, a liquid storage assembly is provided. The liquid storage assembly includes: a liquid storage cavity configured to store to-be-vaporized liquid; a reference element, at least partially located in the liquid storage cavity and including a reference electrode; at least one detection element, at least partially located in the liquid storage cavity, being spaced apart from the reference element, and including a detection electrode; and a detection circuit, electrically connected to the reference element and the at least one detection element, where the detection circuit is configured to detect capacitance between the reference element and the at least one detection element or resistance of the to-be-vaporized liquid through the reference electrode and the detection electrode, and determine a remaining volume of the to-be-vaporized liquid according to the detected capacitance or resistance.

In the first aspect, the at least one detection element includes a first detection element and a second detection element; the reference element, the first detection element, and the second detection element are all completely located in the liquid storage cavity; the first detection element and the reference element form a first capacitor; the second detection element and the reference element form a second capacitor; and a distance between a bottom of the first detection element and a bottom of the liquid storage cavity is less than a distance between a bottom of the second detection element and the bottom of the liquid storage cavity.

The detection circuit includes: a capacitance acquisition module, connected to the reference element, the first detection element, and the second detection element, and configured to acquire capacitance of the first capacitor, output a first electrical signal corresponding to the capacitance of the first capacitor, acquire capacitance of the second capacitor, and output a second electrical signal corresponding to the capacitance of the second capacitor; and a processing module, connected to the capacitance acquisition module, and configured to receive the first electrical signal and the second electrical signal, and determine the remaining volume of the to-be-vaporized liquid according to the first electrical signal and the second electrical signal.

In the first aspect, the remaining volume of the to-be-vaporized liquid includes a first remaining volume, a second remaining volume, and a third remaining volume. The processing module is further configured to: determine the remaining volume of the to-be-vaporized liquid to be the first remaining volume when a voltage of the first electrical signal is equal to a first voltage threshold and a voltage of the second electrical signal is equal to a second voltage threshold, where the first voltage threshold is the corresponding voltage of the first electrical signal when the first detection element is not in contact with the to-be-vaporized liquid in the liquid storage cavity, and the second voltage threshold is the corresponding voltage of the second electrical signal when the second detection element is not in contact with the to-be-vaporized liquid in the liquid storage cavity. The processing module is further configured to determine the remaining volume of the to-be-vaporized liquid to be the second remaining volume when the voltage of the first electrical signal is greater than the first voltage threshold and the voltage of the second electrical signal is equal to the second voltage threshold. The processing module is further configured to determine the remaining volume of the to-be-vaporized liquid to be the third remaining volume when the voltage of the first electrical signal is greater than the first voltage threshold and the voltage of the second electrical signal is greater than the second voltage threshold.

In the first aspect, the capacitance acquisition module includes: a first capacitor acquisition unit, connected to the first detection element, the reference element, and the processing module, and configured to acquire the capacitance of the first capacitor and output the first electrical signal to the processing module; and a second capacitor acquisition unit, connected to the second detection element, the reference element, and the processing module, and configured to acquire the capacitance of the second capacitor and output the second electrical signal to the processing module.

In the first aspect, the detection element includes a first conductive port used as the detection electrode, where the first conductive port is located in the liquid storage cavity. The reference element includes a second conductive port used as the reference electrode, where the second conductive port is located in the liquid storage cavity. The detection element and the reference element extend into the liquid storage cavity from one side of the liquid storage cavity; the first conductive port and the second conductive port correspond to different liquid level heights; and the first conductive port and the second conductive port are electrically connected to a detection circuit for the detection circuit to detect a resistance value of the to-be-vaporized liquid through the first conductive port and the second conductive port, to determine the remaining volume of the to-be-vaporized liquid.

In the first aspect, a side surface of the detection element is insulated, and an end surface of one port of the detection element is conductive to form the first conductive port. A side surface of the reference element is insulated, and an end surface of one port of the reference element is conductive to form the second conductive port.

In the first aspect, the detection circuit includes: a detection module, electrically connected to the first conductive port and the second conductive port, and configured to acquire a first electrical signal by detecting the first conductive port, and acquire a second electrical signal by detecting the second conductive port; and a control module, connected to the detection module, and configured to determine a first resistance value of the to-be-vaporized liquid according to the first electrical signal, determine a second resistance value of the to-be-vaporized liquid according to the second electrical signal, and determine the remaining volume of the to-be-vaporized liquid according to the first resistance value and the second resistance value.

In the first aspect, the detection module includes: a first voltage dividing unit, where a first end of the first voltage dividing unit is configured to input a set voltage, and a second end of the first voltage dividing unit is electrically connected to the first conductive port; and a second voltage dividing unit, where a first end of the second voltage dividing unit is configured to input the set voltage, and a second end of the second voltage dividing unit is electrically connected to the second conductive port. The control module is connected to a first voltage dividing node of the first voltage dividing unit to acquire the first electrical signal, and the control module is connected to a second voltage dividing node of the second voltage dividing unit to acquire the second electrical signal.

In the first aspect, the detection module further includes: a first voltage follower, where an input end of the first voltage follower is connected to the first voltage dividing node, and an output end of the first voltage follower is connected to the control module; and a second voltage follower, where an input end of the second voltage follower is connected to the second voltage dividing node, and an output end of the second voltage follower is connected to the control module.

In the first aspect, a first liquid level height corresponding to the first conductive port is greater than a second liquid level height corresponding to the second conductive port. The remaining volume of the to-be-vaporized liquid includes a first remaining volume, a second remaining volume, and a third remaining volume. The control module is configured to: determine the remaining volume of the to-be-vaporized liquid to be the first remaining volume when both the first resistance value and the second resistance value are greater than or equal to a preset threshold; determine the remaining volume of the to-be-vaporized liquid to be the second remaining volume when the first resistance value is greater than or equal to the preset threshold and the second resistance value is less than the preset threshold; and determine the remaining volume of the to-be-vaporized liquid to be the third remaining volume when both the first resistance value and the second resistance value are less than the preset threshold.

According to a second aspect of the present invention, an electronic vaporization apparatus is provided. The electronic vaporization apparatus includes: the liquid storage assembly according to the foregoing aspect; a vaporization module, configured to vaporize the to-be-vaporized liquid stored in the liquid storage cavity; and a power supply module, configured to supply power to the liquid storage assembly and the vaporization module.

According to a third aspect of the present invention, a remaining volume detection method for to-be-vaporized liquid is provided, applicable to an electronic vaporization apparatus including a liquid storage cavity. The liquid storage cavity is configured to store to-be-vaporized liquid. The remaining volume detection method includes: providing a reference element that is at least partially located in the liquid storage cavity and includes a reference electrode; providing at least one detection element that is at least partially located in the liquid storage cavity and is spaced apart from the reference element, and includes a detection electrode; detecting capacitance between the reference element and the at least one detection element or resistance of the to-be-vaporized liquid; and determining a remaining volume of the to-be-vaporized liquid according to the detected capacitance or resistance.

In the third aspect, the at least one detection element includes a first detection element and a second detection element; the reference element, the first detection element, and the second detection element are all completely located in the liquid storage cavity; the first detection element and the reference element form a first capacitor; the second detection element and the reference element form a second capacitor; and a distance between a bottom of the first detection element and a bottom of the liquid storage cavity is less than a distance between a bottom of the second detection element and the bottom of the liquid storage cavity.

The step of detecting capacitance between the reference element and the at least one detection element includes: acquiring capacitance of the first capacitor, and outputting a first electrical signal corresponding to the capacitance of the first capacitor; and acquiring capacitance of the second capacitor, and outputting a second electrical signal corresponding to the capacitance of the second capacitor.

The step of determining a remaining volume of the to-be-vaporized liquid according to the detected capacitance includes: determining the remaining volume of the to-be-vaporized liquid in the liquid storage cavity according to the first electrical signal and the second electrical signal.

In the third aspect, the remaining volume of the to-be-vaporized liquid includes a first remaining volume, a second remaining volume, and a third remaining volume. The step of determining the remaining volume of the to-be-vaporized liquid in the liquid storage cavity according to the first electrical signal and the second electrical signal includes: determining the remaining volume of the to-be-vaporized liquid to be the first remaining volume when a voltage of the first electrical signal is equal to a first voltage threshold and a voltage of the second electrical signal is equal to a second voltage threshold, where the first voltage threshold is the corresponding voltage of the first electrical signal when the first detection element is not in contact with the to-be-vaporized liquid in the liquid storage cavity, and the second voltage threshold is the corresponding voltage of the second electrical signal when the second detection element is not in contact with the to-be-vaporized liquid in the liquid storage cavity; determining the remaining volume of the to-be-vaporized liquid to be the second remaining volume when the voltage of the first electrical signal is greater than the first voltage threshold and the voltage of the second electrical signal is equal to the second voltage threshold; and determining the remaining volume of the to-be-vaporized liquid to be the third remaining volume when the voltage of the first electrical signal is greater than the first voltage threshold and the voltage of the second electrical signal is greater than the second voltage threshold.

In the third aspect, the detection element includes a first conductive port used as the detection electrode, where the first conductive port is located in the liquid storage cavity; and the reference element includes a second conductive port used as the reference electrode, where the second conductive port is located in the liquid storage cavity.

The step of detecting resistance of the to-be-vaporized liquid includes: acquiring a first electrical signal of the first conductive port and acquiring a second electrical signal of the second conductive port; and determining a first resistance value of the to-be-vaporized liquid according to the first electrical signal, and determining a second resistance value of the to-be-vaporized liquid according to the second electrical signal.

the step of determining a remaining volume of the to-be-vaporized liquid according to the detected resistance includes: determining the remaining volume of the to-be-vaporized liquid according to the first resistance value and the second resistance value.

According to the foregoing liquid storage assembly, electronic vaporization apparatus, and remaining volume detection method, the capacitance between the reference element and the at least one detection element or the resistance of the to-be-vaporized liquid is detected through the reference electrode and the detection electrode, and the remaining volume of the to-be-vaporized liquid is determined according to the detected capacitance or resistance, which simplifies complexity of the design for detecting the remaining volume of the to-be-vaporized liquid, thereby improving detection accuracy.

In an implementation for detecting the capacitance, the first electrical signal that is outputted by the capacitance acquisition module and corresponds to the capacitance of the first capacitor acquired by the capacitance acquisition module, and the electrical signal that corresponds to the capacitance of the second capacitor acquired by the capacitance acquisition module are acquired by the processing module, and through the processing module, the remaining volume of the to-be-vaporized liquid in the liquid storage cavity is accurately determined according to the first electrical signal and the second electrical signal, which avoids dry burning of the electronic vaporization apparatus because the to-be-vaporized liquid in the liquid storage cavity has been exhausted but the electronic vaporization apparatus still continues to be used, thereby improving the detection accuracy of the remaining volume of the to-be-vaporized liquid stored in the liquid storage cavity of the electronic vaporization apparatus.

In an implementation for detecting the resistance, the detection element and the reference element extend into the liquid storage cavity from one side of the liquid storage cavity, and the first conductive port and the second conductive port correspond to different liquid level heights, so that two detection terminals in the liquid storage cavity are used as two electrodes, that is, a detection electrode and a reference electrode respectively. When the remaining volumes of the to-be-vaporized liquid in the liquid storage cavity are different, resistance values of the to-be-vaporized liquid detected by the detection circuit through the two electrically-connected detection terminals are different, and therefore a status of the remaining volume of the to-be-vaporized liquid can be determined. Since the liquid storage cavity is provided with two conductive ports, that is, the liquid storage cavity is provided with the detection electrode and the reference electrode, when the detection circuit detects the to-be-vaporized liquid, the remaining volume of the to-be-vaporized liquid may be determined through relative values of the detection electrode and the reference electrode. Detection of the remaining volume of the to-be-vaporized liquid is simple in design and low in cost, and the remaining volume is determined in a manner of comparing the two detection terminals, so that a situation in which detection precision is influenced by the detection circuit due to a change in the resistance value of the to-be-vaporized liquid in the liquid storage cavity is avoided, and the detection result is not likely to cause an erroneous determination.

To help understand this application, the following describes this application more fully with reference to the related accompanying drawings. The accompanying drawings show embodiments of this application. However, this application may be implemented in many different forms, and is not limited to the embodiments described in this specification. On the contrary, the embodiments are provided to make the disclosed content of this application clearer and more comprehensive.

Unless otherwise defined, meanings of all technical and scientific terms used in this specification are the same as that usually understood by a person skilled in the technical field to which this application belongs. In this application, terms used in the specification of this application are merely intended to describe objectives of the specific embodiments, but are not intended to limit this application.

It may be understood that the terms "first", "second", and the like used in this application may be used for describing various elements in this specification. However, the elements are not limited by the terms. The terms are merely used for distinguishing a first element from another element. For example, a first resistor may be referred to as a second resistor and, similarly, a second resistor may be referred to as a first resistor, without departing from the scope of this application. Both the first resistor and the second resistor are resistors, but not the same resistor.

It may be understood that "connected" in the following embodiments is to be interpreted as "electrically connected", "communicatively connected", or the like if an electrical signal or data is transferred between the connected circuits, modules, units, and the like When used herein, singular forms "a", "an" and "the" may also include plural forms, unless otherwise clearly specified in the context. It should further be understood that terms such as "including/comprising" or "having" specify the presence of stated features, integers, steps, operations, assemblies, portions, or combinations thereof, but do not preclude the possibility of the presence or addition of one or more other features, integers, steps, operations, assemblies, portions, or combinations thereof.

A conventional electronic vaporization apparatus generally includes a vaporizer and a power supply module (that is, a power supply component). The vaporizer includes a housing component and a vaporization module. The housing component may be sleeved outside the vaporization module and configured to form a liquid storage cavity. The liquid storage cavity is configured to store to-be-vaporized liquid. The vaporization module includes a vaporization base, a support base, and a heating element, and is configured to heat and vaporize the to-be-vaporized liquid in the liquid storage cavity, to generate an aerosol for an inhaler to inhale. The power supply module is configured to supply power to the vaporizer.

The present invention relates to a liquid storage assembly, including: a liquid storage cavity configured to store to-be-vaporized liquid; a reference element, at least partially located in the liquid storage cavity and including a reference electrode; at least one detection element, at least partially located in the liquid storage cavity, being spaced apart from the reference element, and including a detection electrode; and a detection circuit, electric ally connected to the reference element and the at least one detection element, where the detection circuit is configured to detect capacitance between the reference element and the at least one detection element or resistance of the to-be-vaporized liquid through the reference electrode and the detection electrode, and determine a remaining volume of the to-be-vaporized liquid according to the detected capacitance or resistance.

The present invention further relates to an electronic vaporization apparatus, including: the foregoing liquid storage assembly; a vaporization module, configured to vaporize the to-be-vaporized liquid stored in the liquid storage cavity; and a power supply module, configured to supply power to the liquid storage assembly and the vaporization module.

The present invention further relates to a remaining volume detection method for to-be-vaporized liquid, applicable to an electronic vaporization apparatus including a liquid storage cavity. The liquid storage cavity is configured to store to-be-vaporized liquid. The remaining volume detection method includes: detecting capacitance between a reference element and at least one detection element or resistance of the to-be-vaporized liquid through the reference electrode and the detection electrode; and determining a remaining volume of the to-be-vaporized liquid according to the detected capacitance or resistance; where, the reference element is at least partially located in the liquid storage cavity and includes a reference electrode; and the at least one detection element is at least partially located in the liquid storage cavity and is spaced apart from the reference element, and includes a detection electrode.

The following describes the implementations of the present invention in detail by using capacitance-based detection and resistance-based detection as examples.

Figure 2:
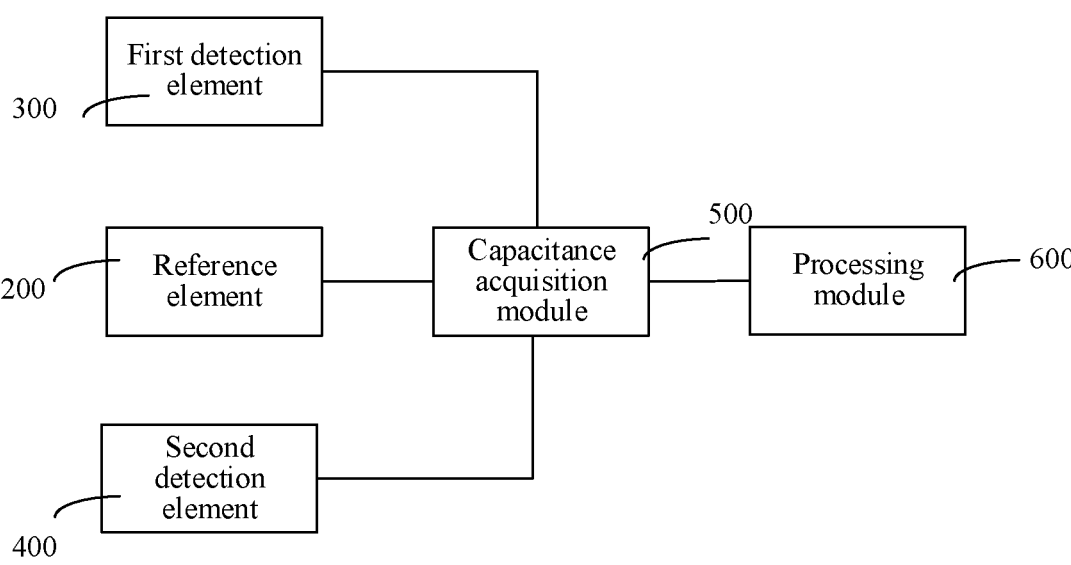
FIG. 2 is a block diagram of a first structure of the electronic vaporization apparatus according to the first example of the present invention.

First, an electronic vaporization apparatus according to a first example of the present invention is described. In the electronic vaporization apparatus, a remaining volume of to-be-vaporized liquid stored in a liquid storage cavity is detected based on detection for capacitance. FIG. 1 shows the electronic vaporization apparatus according to the first example of the present invention. The electronic vaporization apparatus includes a suction nozzle, a liquid storage cavity 100, a reference element 200, a first detection element 300, and a second detection element 400. With reference to FIG. 2, in an embodiment, the electronic vaporization apparatus further includes a capacitance acquisition module 500 and a processing module 600. An input end of the capacitance acquisition module 500 is connected to the reference element 200, the first detection element 300, and the second detection element 400, and an output end of the capacitance acquisition module 500 is connected to the processing module 600.

The liquid storage cavity 100 is configured to store to-be-vaporized liquid. The to-be-vaporized liquid is also referred to as a vaporization substrate. After the to-be-vaporized liquid in the liquid storage cavity 100 is heated and vaporized, an aerosol that can be inhaled by an inhaler can be generated. The capacitance acquisition module 500 and the processing module 600 form a detection circuit. The liquid storage cavity 100, the reference element 200, the first detection element 300, the second detection element 400, and the detection circuit form a liquid storage assembly. The reference element 200 includes a reference electrode, the first detection element 300 includes a first electrode, and the second detection element 400 includes a second electrode.

The reference element 200 may be a heating element. The heating element is electrically connected to the power supply module, and may not only heat and vaporize the to-be-vaporized liquid in the liquid storage cavity 100, but also serve as the reference element 200 of the electronic vaporization apparatus. Therefore, costs of the electronic vaporization apparatus can be reduced. It may be understood that the reference element 200 may also be another metal component such as a vaporization base or a support base of a vaporizer. In addition, the reference element 200 may also be a specially arranged electrode plate for providing a reference electrode. The above is merely a specific example, which may be flexibly set according to requirements in practical applications and is not limited herein.

The first detection element 300 and the reference element 200 form a first capacitor, and the second detection element 400 and the reference element form a second capacitor. A distance between a bottom of the first detection element 300 and a bottom of the liquid storage cavity 100 is greater than a distance between a bottom of the second detection element 400 and the bottom of the liquid storage cavity 100. That is, heights of the first detection element 300 and the second detection element 400 in an axial direction of the liquid storage cavity 100 are different. In a specific example, the bottom of the first detection element 300 is away from the suction nozzle of the vaporizer relative to a top of the first detection element 300, the bottom of the liquid storage cavity 100 is away from the suction nozzle of the vaporizer relative to a top of the liquid storage cavity 100, and the bottom of the second detection element 400 is away from the suction nozzle of the vaporizer relative to a top of the second detection element 400. The above is merely a specific example, which may be flexibly set according to requirements in practical applications and is not limited herein.

In an embodiment, the first detection element 300 and the second detection element 400 may be, but are not limited to be, metal sheets or metal meshes coated with insulation materials. Therefore, the overall cost of the electronic vaporization apparatus is reduced. In a specific example, the first detection element 300 or the second detection element 400 may also be another metal component such as the vaporization base or the support base. of the vaporizer. It may be understood that the first detection element 300, the second detection element 400, and the reference element 200 are three electrodes independent from each other. To ensure detection accuracy of the remaining volume of the to-be-vaporized liquid, the first detection element 300, the second detection element 400, and the reference element 200 may be different metal components of the vaporizer. The above is merely a specific example, which may be flexibly set according to requirements in practical applications and is not limited herein.

In addition, sizes and shapes of the first detection element 300 and the second detection element 400 are not limited, and it is only necessary that the distance between the bottom of the first detection element 300 and the bottom of the liquid storage cavity 100 is less than the distance between the bottom of the second detection element 400 and the bottom of the liquid storage cavity 100. In a specific example, the first detection element 300 may be, but is not limited to be, a first detection element plate. Therefore, the first capacitor formed by the first detection element plate and the reference element 200 is a first capacitor plate. The second detection element 400 may be, but is not limited to be, a second detection element plate. Therefore, the second capacitor formed by the second detection element 400 and the reference element 200 is a second capacitor plate. The above is merely a specific example, which may be flexibly set according to requirements in practical applications and is not limited herein.

In an embodiment, the first detection element 300 and second detection element 400 are respectively adhered to inner side walls of the liquid storage cavity, and therefore, it is convenient for the first capacitor and the second capacitor to measure a change of a liquid level of the to-be-vaporized liquid in the liquid storage cavity based on a capacitive sensing principle, thereby improving convenience of detecting the remaining volume of the to-be-vaporized liquid in the liquid storage cavity of the electronic vaporization apparatus.

The capacitance acquisition module 500 is configured to acquire capacitance of the first capacitor and output a first electrical signal corresponding to the capacitance of the first capacitor. The capacitance acquisition module 500 is further configured to acquire capacitance of the second capacitor and output a second electrical signal corresponding to the capacitance of the second capacitor.

Figure 3:
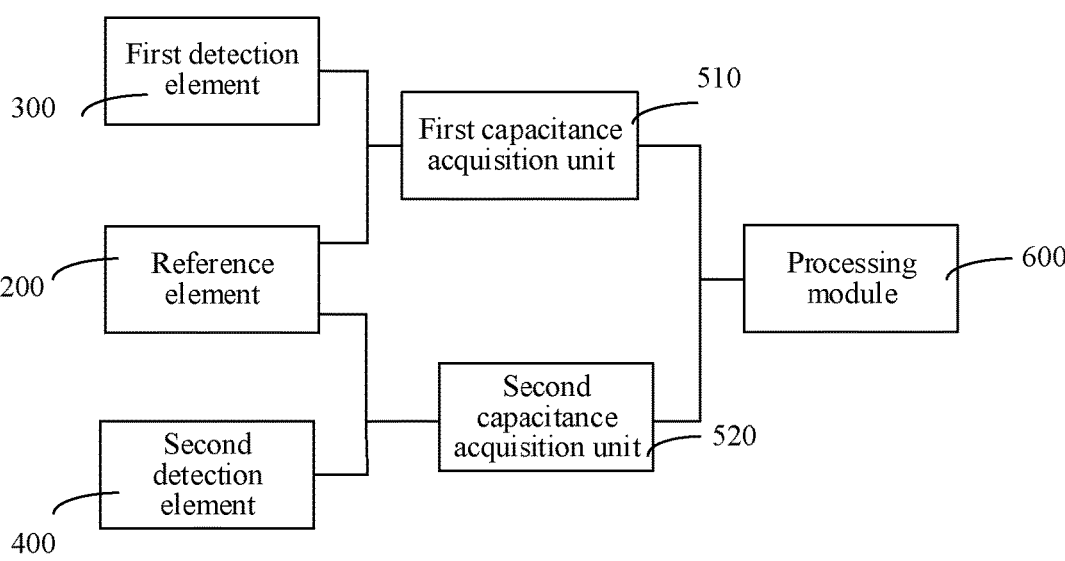
FIG. 3 is a block diagram of a second structure of the electronic vaporization apparatus according to the first example of the present invention.

In an embodiment, as shown in FIG. 3, the capacitance acquisition module 500 includes a first capacitor acquisition unit 510 and a second capacitor acquisition unit 520. The first capacitor acquisition unit 510 is connected to the first detection element 300, the reference element 200, and the processing module 600. The second capacitor acquisition unit 520 is connected to the second detection element 400, the reference element 200, and the processing module 600.

The first capacitor acquisition unit 510 is configured to acquire a capacitance value of the first capacitor and output the first electrical signal to the processing module 600. The second capacitor acquisition unit 520 is configured to acquire a capacitance value of the second capacitor and output the second electrical signal to the processing module 600.

In this embodiment, the first capacitor acquisition unit 510 and the second capacitor acquisition unit 520 respectively acquire the capacitance of the first capacitor and the capacitance of the second capacitor, and respectively output the first electrical signal and the second electrical signal to the processing module 600, whereby the processing module 600 determines the remaining volume of the to-be-vaporized liquid in the liquid storage cavity according to the first electrical signal and the second electrical signal, thereby improving efficiency of detecting the remaining volume of the to-be-vaporized liquid in the liquid storage cavity of the electronic vaporization apparatus. It may be understood that the remaining volume of the to-be-vaporized liquid indicates a content state of the to-be-vaporized liquid in the liquid storage cavity.

The processing module 600 is configured to receive the first electrical signal and the second electrical signal outputted by the capacitance acquisition module 500 and determine the remaining volume of the to-be-vaporized liquid in the liquid storage cavity according to the first electrical signal and the second electrical signal. In an embodiment, the processing module 600 may be, but is not limited to be, a single-chip microcomputer.

In a specific example, based on the capacitive sensing principle, the reference element 200 is used as negative electrodes of the first capacitor and the second capacitor, the first detection element 300 is used as a positive electrode of the first capacitor, and the second detection element 400 is used as a positive electrode of the second capacitor. Therefore, the first detection element 300 and the reference element 200 form the first capacitor, and the second detection element 400 and the reference element 200 form the second capacitor.

The capacitance is calculated based on the following expression:

$$C = \frac{\varepsilon \cdot S}{d},$$

where C is capacitance; $\varepsilon$ is a electric constant of a medium between plates; S is a plate area; and d is a distance between the plates.

Therefore, when content of the to-be-vaporized liquid stored in the liquid storage cavity 100 is increased, the liquid level of the to-be-vaporized liquid in the liquid storage cavity 100 will rise. In this case, an area of the first capacitor or the second capacitor in contact with the to-be-vaporized liquid will be correspondingly increased, and the capacitance of the first capacitor or the second capacitor will also be correspondingly increased. That is, the capacitance of the first capacitor or the capacitance of the second capacitor acquired by the capacitance acquisition module 500 will be correspondingly increased. Thus, a voltage of the first electrical signal corresponding to the capacitance of the first capacitor or a voltage of the second electrical signal corresponding to the capacitance of a capacitor plate outputted by the capacitance acquisition module 500 is correspondingly increased. In other words, the capacitance of the first capacitor is proportional to the voltage of the first electrical signal, and the capacitance of the second capacitor is proportional to the voltage of the second electrical signal. Thus, the processing module 600 may accurately determine the remaining volume of the to-be-vaporized liquid in the liquid storage cavity 100 through the first electrical signal and the second electrical signal. The above is merely a specific example, which may be flexibly set according to requirements in practical applications and is not limited herein.

Based on this, the first electrical signal outputted by the capacitance acquisition module 500 and corresponding to the capacitance of the first capacitor acquired by the capacitance acquisition module and the electrical signal corresponding to the capacitance of the second capacitor acquired by the capacitance acquisition module are acquired by the processing module 600. Moreover, the processing module 600 accurately determines the remaining volume of the to-be-vaporized liquid in the liquid storage cavity according to the first electrical signal and the second electrical signal, thereby avoiding a dry burning phenomenon of the electronic vaporization apparatus due to a continuing use of the electronic vaporization apparatus when the to-be-vaporized liquid in the liquid storage cavity 100 has been exhausted, and improving the detection accuracy of the remaining volume of the to-be-vaporized liquid stored in the liquid storage cavity of the electronic vaporization apparatus.

In a specific example, the electronic vaporization apparatus further includes a third detection element including a third electrode. The capacitance acquisition module 500 is connected to the third detection element. The third detection element and the reference element form a third capacitor. A distance between a bottom of the third detection element and the bottom of the liquid storage cavity 100 is less than the distance between the bottom of the second detection element and the bottom of the liquid storage cavity. The capacitance acquisition module 500 is further configured to acquire capacitance of the third capacitor, and output a third electrical signal corresponding to the capacitance of the third capacitor to the processing module 600. The processing module 600 may determine the remaining volume of the to-be-vaporized liquid in the liquid storage cavity according to the first electrical signal, the second electrical signal and the third electrical signal, thereby further improving the detection accuracy of the remaining volume of the to-be-vaporized liquid stored in the liquid storage cavity of the electronic vaporization apparatus. The above is merely a specific example. A number of detection elements in the electronic vaporization apparatus may be flexibly limited according to the requirements for the detection accuracy of the remaining volume of the to-be-vaporized liquid in the liquid storage cavity of the electronic vaporization apparatus, and is not limited herein.

In an embodiment, the remaining volume of the to-be-vaporized liquid may include a first remaining volume, a second remaining volume, and a third remaining volume.

The processing module 600 is further configured to determine the remaining volume of the to-be-vaporized liquid to be the first remaining volume when the voltage of the first electrical signal is equal to a first voltage threshold and the voltage of the second electrical signal is equal to a second voltage threshold.

The first voltage threshold is the corresponding voltage of the first electrical signal when the first detection element 300 is not in contact with the to-be-vaporized liquid in the liquid storage cavity 100. The second voltage threshold is the corresponding voltage of the second electrical signal when the second detection element 400 is not in contact with the to-be-vaporized liquid in the liquid storage cavity 100. When the voltage of the first electrical signal is equal to the first voltage threshold, it indicates that the first detection element 300 is not in contact with the to-be-vaporized liquid in the liquid storage cavity 100 at this moment. Meanwhile, when the voltage of the second electrical signal is equal to the second voltage threshold, it indicates that the second detection element 400 is not in contact with the to-be-vaporized liquid in the liquid storage cavity 100. Therefore, when the voltage of the first electrical signal of the processing module 600 is equal to the first voltage threshold and the voltage of the second electrical signal is equal to the second voltage threshold, that is, when both the first detection element 300 and the second detection element 400 are not in contact with the to-be-vaporized liquid in the liquid storage cavity 100, it indicates that the remaining volume of the to-be-vaporized liquid in the liquid storage cavity 100 is very less or even there is no to-be-vaporized liquid, that is, dry burning of the heating element in the vaporizer is caused. Therefore, the remaining volume of the to-be-vaporized liquid is determined to be the first remaining volume. It may be understood that the processing module 600 of the electronic vaporization apparatus may control the electronic vaporization apparatus to stop operating when detecting that the remaining volume of the to-be-vaporized liquid is the first remaining volume, thereby avoiding the risk of dry burning of the vaporizer. The electronic vaporization apparatus may further include a reminder module that may be configured to remind a user to stop inhaling, replace the vaporizer, or add to-be-vaporized liquid to the liquid storage cavity 100 in time, thereby further reducing the risk of dry burning of the electronic vaporization apparatus.

The processing module 600 is further configured to determine the remaining volume of the to-be-vaporized liquid to be the second remaining volume when the voltage of the first electrical signal is greater than the first voltage threshold and the voltage of the second electrical signal is equal to the second voltage threshold.

When the voltage of the first electrical signal is greater than the first voltage threshold, it indicates that the first detection element 300 is not in contact with the to-be-vaporized liquid in the liquid storage cavity 100 at this moment. Meanwhile, when the voltage of the second electrical signal is equal to the second voltage threshold, it indicates that the second detection element 400 is not in contact with the to-be-vaporized liquid in the liquid storage cavity 100. Therefore, when the voltage of the first electrical signal of the processing module 600 is greater than the first voltage threshold and the voltage of the second electrical signal is equal to the second voltage threshold, that is, when the first detection element 300 is in contact with the to-be-vaporized liquid in the liquid storage cavity 100 but the second detection element 400 is not in contact with the to-be-vaporized liquid in the liquid storage cavity 100, it indicates that the to-be-vaporized liquid in the liquid storage cavity 100 is not in a very small amount or even in a case that there is no to-be-vaporized liquid, but the to-be-vaporized liquid in the liquid storage cavity 100 is not filled up. Therefore, the remaining volume of the to-be-vaporized liquid is determined to be the second remaining volume. Therefore, when the remaining volume of the to-be-vaporized liquid is the second remaining volume, the reminder module of the electronic vaporization apparatus may be configured to remind a user of the electronic vaporization apparatus that the electronic vaporization apparatus can be continuously safely used.

the processing module 600 is further configured to determine the remaining volume of the to-be-vaporized liquid to be the third remaining volume when the voltage of the first electrical signal is greater than the first voltage threshold and the voltage of the second electrical signal is greater than the second voltage threshold.

When the voltage of the first electrical signal is greater than the first voltage threshold, it indicates that the first detection element 300 is not in contact with the to-be-vaporized liquid in the liquid storage cavity 100 at this moment. Meanwhile, when the voltage of the second electrical signal is greater than the second voltage threshold, it indicates that the second detection element 400 is in contact with the to-be-vaporized liquid in the liquid storage cavity 100. Therefore, when the voltage of the first electrical signal of the processing module 600 is greater than the first voltage threshold and the voltage of the second electrical signal is greater than the second voltage threshold, that is, when both the first detection element 300 and the second detection element 400 are in contact with the to-be-vaporized liquid in the liquid storage cavity 100, it indicates that the to-be-vaporized liquid in the liquid storage cavity 100 is in a relatively full condition. Therefore, the remaining volume of the to-be-vaporized liquid is determined to be the third remaining volume. In some embodiments, the vaporizer of the electronic vaporization apparatus may be injected with the to-be-vaporized liquid, and if the remaining volume of the to-be-vaporized liquid is determined to be the third remaining volume, the reminder module of the electronic vaporization apparatus may also be configured to remind that the injection of the to-be-vaporized liquid is stopped, to prevent any liquid from leaking out In this embodiment, by comparing the voltage of the first electrical signal with the first voltage threshold and comparing the voltage of the second electrical signal with the second voltage threshold, it can be accurately determined that whether the remaining volume of the to-be-vaporized liquid in the liquid storage cavity 100 is the first remaining volume, the second remaining volume, or the third remaining volume, thereby improving the detection accuracy of the remaining volume of the to-be-vaporized liquid in the liquid storage cavity of the electronic vaporization apparatus.

Figure 4:
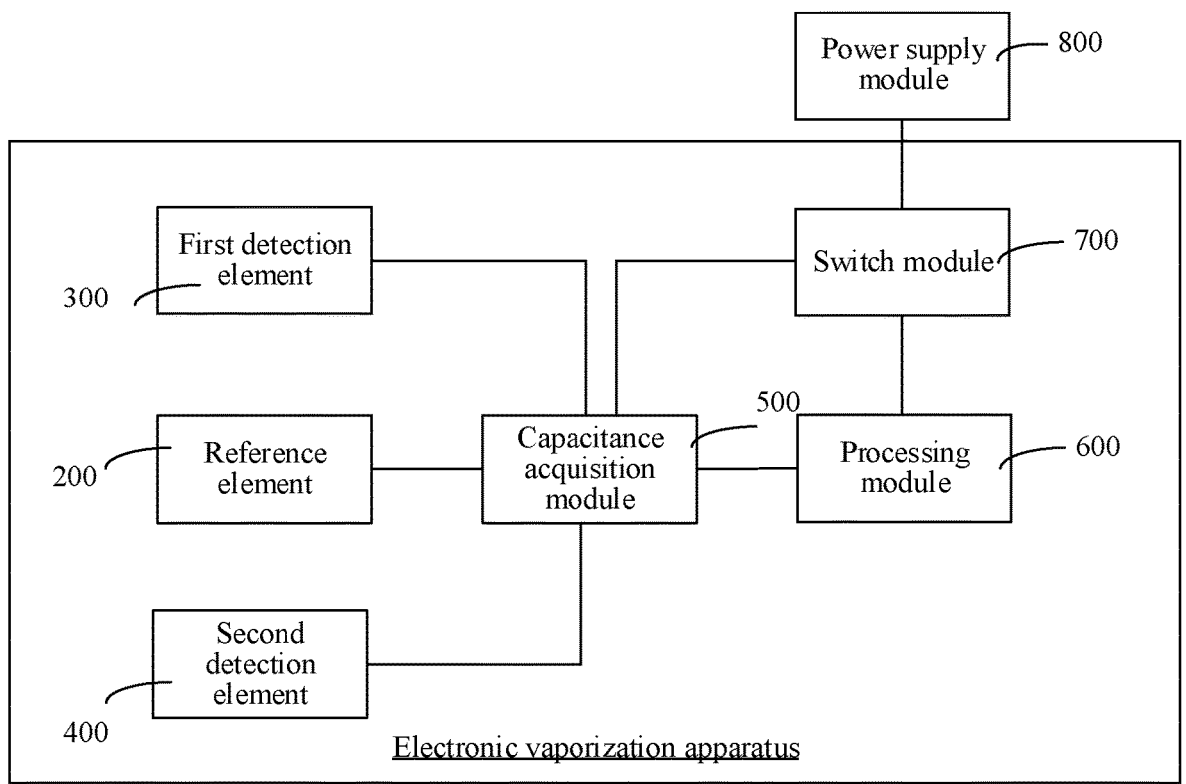
FIG. 4 is a block diagram of a third structure of the electronic vaporization apparatus according to the first example of the present invention.

In an embodiment, as shown in FIG. 4, the electronic vaporization apparatus further includes a switch module 700. The processing module 600 is connected to the switch module 700.

The processing module 600 is further configured to output a first trigger signal to the switch module 700.

The switch module 700 is connected to the capacitance acquisition module 500 and a power supply module 800, and is configured to control a power supply source to supply power to the capacitance acquisition module according to the first trigger signal. In an embodiment, the switch module 700 is a P-Channel enhancement-type MOSFET. A drain electrode of the P-Channel enhancement-type MOSFET is connected to the capacitance acquisition module, a grid electrode of the P-Channel enhancement-type MOSFET is connected to the processing module, and a source electrode of the P-Channel enhancement-type MOSFET is connected to the power supply source.

In a specific example, when it is required to detect the remaining volume of the to-be-vaporized liquid in the electronic vaporization apparatus, the processing module 600 may output a first trigger signal greater than a turn-on voltage of the switch module 700 to the switch module 700. Thus, the switch module may turn on the power supply source and the capacitance acquisition module 500 according to the first trigger signal, whereby the power supply source supplies power to the capacitance acquisition module. Conversely, when the detection of the remaining volume of the to-be-vaporized liquid in the liquid storage cavity of the electronic vaporization apparatus is stopped, the processing module 600 may output a first trigger signal less than the turn-on voltage of the switch module 700 to the switch module 700. Thus, the switch module may turn off the power supply source and the capacitance acquisition module 500 according to the first trigger signal, whereby the power supply source stops supplying power to the capacitance acquisition module. The above is merely a specific example, which may be flexibly set according to requirements in practical applications and is not limited herein.

In this embodiment, by arranging the switch module 700 in the electronic vaporization apparatus and outputting the first trigger signal to the switch module 700 through the processing module 600, the switch module 700 controls the power supply source to supply power to the capacitance acquisition module according to the first trigger signal. Therefore, the convenience and safety of the electronic vaporization apparatus are improved.

Figure 5:
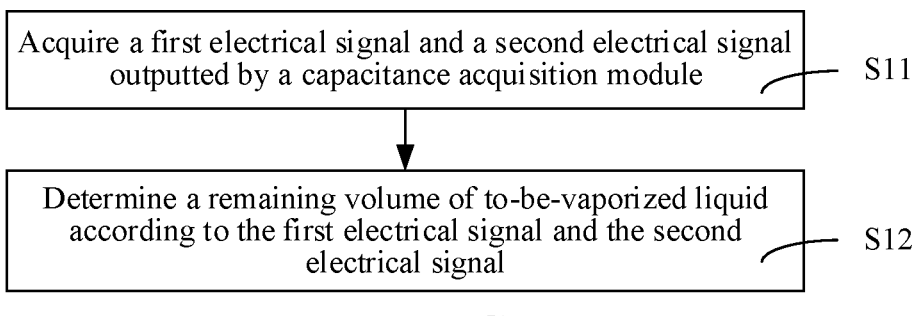
FIG. 5 is a schematic flowchart of a remaining volume detection method for to-be-vaporized liquid according to the first example of the present invention.

FIG. 5 shows a process of a remaining volume detection method for to-be-vaporized liquid, which is applicable to the foregoing electronic vaporization apparatus. The method includes steps S11 to S12.

Step S11. Acquire a first electrical signal and a second electrical signal outputted by a capacitance acquisition module 500.

The first electrical signal corresponds to capacitance of a first capacitor acquired by the capacitance acquisition module 500. The second electrical signal corresponds to capacitance of a second capacitor acquired by the capacitance acquisition module 500. The first capacitor includes a first detection element 300 and a reference element 200. The liquid storage cavity 100 is configured to store to-be-vaporized liquid. The second capacitor includes a second detection element 400 and the reference element 200. A distance between a bottom of the first detection element 300 and a bottom of the liquid storage cavity 100 is less than a distance between a bottom of the second detection element 400 and the bottom of the liquid storage cavity 100. A processing module 600 in the electronic vaporization apparatus may acquire the first electrical signal and the second electrical signal outputted by the capacitance acquisition module 500.

Step S12. Determine a remaining volume of the to-be-vaporized liquid in the liquid storage cavity 100 according to the first electrical signal and the second electrical signal.

The processing module 600 in the electronic vaporization apparatus may accurately determine the remaining volume of the to-be-vaporized liquid in the liquid storage cavity 100 according to the first electrical signal and the second electrical signal.

In this embodiment, the first electrical signal outputted by the capacitance acquisition module 500 and corresponding to the capacitance of the first capacitor acquired by the capacitance acquisition module and the electrical signal corresponding to the capacitance of the second capacitor acquired by the capacitance acquisition module are acquired by the processing module 600. Moreover, the processing module 600 accurately determines the remaining volume of the to-be-vaporized liquid in the liquid storage cavity according to the first electrical signal and the second electrical signal, thereby avoiding the dry burning phenomenon of the electronic vaporization apparatus because the to-be-vaporized liquid in the liquid storage cavity 100 has been exhausted but the electronic vaporization apparatus still continues to be used, thereby improving the detection accuracy of the remaining volume of the to-be-vaporized liquid stored in the liquid storage cavity of the electronic vaporization apparatus.

Figure 6:
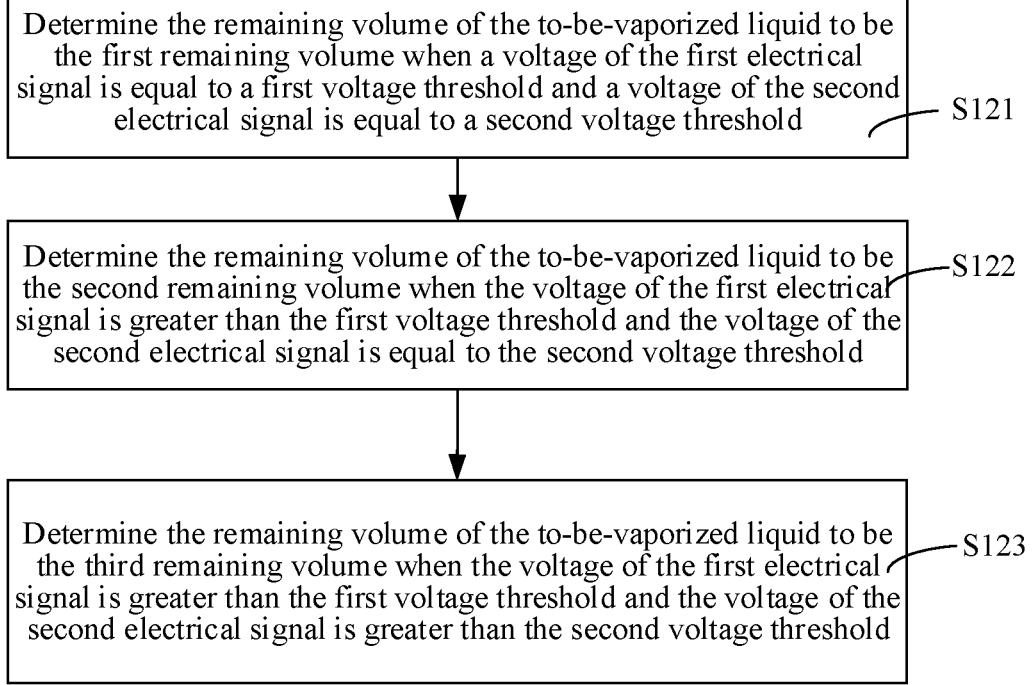
FIG. 6 is a schematic flowchart of a step of determining a remaining volume of to-be-vaporized liquid according to the first example of the present invention.

In an embodiment, the remaining volume of the to-be-vaporized liquid includes a first remaining volume, a second remaining volume, and a third remaining volume. As shown in FIG. 6, the step of determining the remaining volume of the to-be-vaporized liquid in the liquid storage cavity according to the first electrical signal and the second electrical signal includes steps S121 and S123.

Step S121. Determine the remaining volume of the to-be-vaporized liquid to be the first remaining volume when a voltage of the first electrical signal is equal to a first voltage threshold and a voltage of the second electrical signal is equal to a second voltage threshold.

The first voltage threshold is the corresponding voltage of the first electrical signal when the first detection element is not in contact with the to-be-vaporized liquid in the liquid storage cavity 100. The second voltage threshold is the corresponding voltage of the second electrical signal when the second detection element is not in contact with the to-be-vaporized liquid in the liquid storage cavity 100.

Step S122. Determine the remaining volume of the to-be-vaporized liquid to be the second remaining volume when the voltage of the first electrical signal is greater than the first voltage threshold and the voltage of the second electrical signal is equal to the second voltage threshold.

Step S123. Determine the remaining volume of the to-be-vaporized liquid to be the third remaining volume when the voltage of the first electrical signal is greater than the first voltage threshold and the voltage of the second electrical signal is greater than the second voltage threshold.

In this embodiment, by comparing the voltage of the first electrical signal with the first voltage threshold and comparing the voltage of the second electrical signal with the second voltage threshold, it can be accurately determined that whether the remaining volume of the to-be-vaporized liquid in the liquid storage cavity 100 is the first remaining volume, the second remaining volume, or the third remaining volume, thereby improving the detection accuracy of the remaining volume of the to-be-vaporized liquid in the liquid storage cavity of the electronic vaporization apparatus.

It should be understood that, although each step of the flowcharts in FIG. 5 and FIG. 6 is displayed sequentially according to arrows, the steps are not necessarily performed according to an order indicated by arrows. Unless otherwise explicitly specified in this specification, execution of the steps is not strictly limited, and the steps may be performed in other sequences. In addition, at least some steps in FIG. 5 and FIG. 6 may include a plurality of steps or a plurality of stages. The steps or the stages are not necessarily performed at the same moment, and instead may be performed at different moments. The steps or the stages are not necessarily performed sequentially, and instead may be performed in turn or alternately with another step or at least some of steps or stages of the another step.

Figures 7, 8:
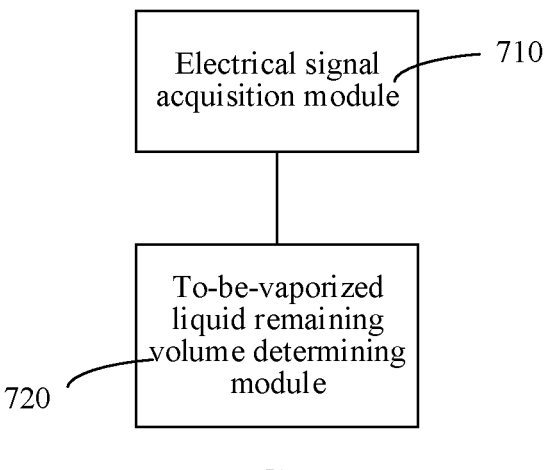
FIG. 7 is a block diagram of a structure of a remaining volume detection device for to-be-vaporized liquid according to the first example of the present invention.
FIG. 8 is a block diagram of a to-be-vaporized liquid remaining volume determining module according to the first example of the present invention.

FIG. 7 shows a structure of a remaining volume detection device for to-be-vaporized liquid that is applicable to an electronic vaporization apparatus. The remaining volume detection device includes an electrical signal acquisition module 710 and a to-be-vaporized liquid remaining volume determining module 720.

The electrical signal acquisition module 710 is configured to acquire a first electrical signal and a second electrical signal outputted by a capacitance acquisition module. The first electrical signal corresponds to capacitance of a first capacitor acquired by the capacitance acquisition module 500. The second electrical signal corresponds to capacitance of a second capacitor acquired by the capacitance acquisition module 500. The first capacitor includes a first detection element 300 and a reference element 200. The liquid storage cavity 100 is configured to store to-be-vaporized liquid. The second capacitor includes a second detection element 400 and the reference element 200. A distance between a bottom of the first detection element 300 and a bottom of the liquid storage cavity 100 is less than a distance between a bottom of the second detection element 400 and the bottom of the liquid storage cavity 100. A processing module 600 in the electronic vaporization apparatus may acquire the first electrical signal and the second electrical signal outputted by the capacitance acquisition module 500. The to-be-vaporized liquid remaining volume determining module 720 is configured to determine a remaining volume of the to-be-vaporized liquid in the liquid storage cavity 100 according to the first electrical signal and the second electrical signal.

In an embodiment, as shown in FIG. 8, the remaining volume of the to-be-vaporized liquid includes a first remaining volume, a second remaining volume, and a third remaining volume. The to-be-vaporized liquid remaining volume determining module 720 includes a first remaining volume determining unit 721, a second remaining volume determining unit 722, and a third remaining volume determining unit 723.

The first remaining volume determining unit 721 is configured to determine the remaining volume of the to-be-vaporized liquid to be the first remaining volume when the voltage of the first electrical signal is equal to a first voltage threshold and the voltage of the second electrical signal is equal to a second voltage threshold. The first voltage threshold is the corresponding voltage of the first electrical signal when the first detection element is not in contact with the to-be-vaporized liquid in the liquid storage cavity 100. The second voltage threshold is the corresponding voltage of the second electrical signal when the second detection element is not in contact with the to-be-vaporized liquid in the liquid storage cavity 100. The second remaining volume determining unit 722 is configured to determine the remaining volume of the to-be-vaporized liquid to be the second remaining volume when the voltage of the first electrical signal is greater than the first voltage threshold and the voltage of the second electrical signal is equal to the second voltage threshold. The third remaining volume determining unit 723 is configured to determine the remaining volume of the to-be-vaporized liquid to be the third remaining volume when the voltage of the first electrical signal is greater than the first voltage threshold and the voltage of the second electrical signal is greater than the second voltage threshold.

For a specific limitation on the remaining volume detection device, reference may be made to the limitation on the remaining volume detection method for to-be-vaporized liquid in a liquid storage cavity above, and details are not described herein again. The modules in the foregoing remaining volume detection device may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a terminal, and an internal structure diagram thereof may be shown in FIG. 9. The computer device includes a processor, a memory, a communication interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The communication interface of the computer device is configured to communicate with an external terminal in a wired or a wireless manner, and the wireless manner can be implemented by using WIFI, an operator network, NFC, or other technologies. The computer program, when executed by a processor, implements a remaining volume detection method for to-be-vaporized liquid. The display screen of the computer device may be a liquid crystal display screen or an electronic ink display screen. The input apparatus of the computer device may be a touch layer covering the display screen, or may be a key, a trackball, or a touch pad disposed on a housing of the computer device, and may further be an external keyboard, a touch pad, a mouse, or the like.

Figure 9:
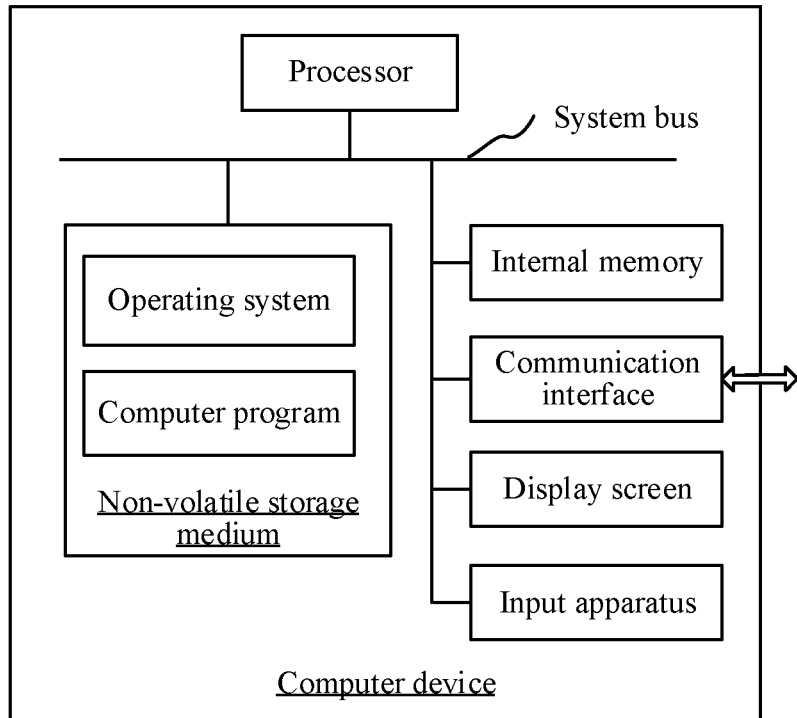
FIG. 9 is a diagram of an internal structure of a computer device according to the first example of the present invention.

A person skilled in the art may understand that, the structure shown in FIG. 9 is only a block diagram of a part of a structure related to a solution of this application and does not limit the computer device to which the solution of this application is applied. Specifically, the computer device may include more or fewer members than those in the drawings, or include a combination of some members, or include different member layouts.

In one embodiment, a computer device is provided. The computer device includes a memory and a processor. The memory stores a computer program. The processor, when executing the computer program, implements the steps of any method in the foregoing method embodiment.

In one embodiment, a computer-readable storage medium is provided. The computer-readable storage medium has a computer program stored thereon. The computer program, when executed by a processor, implements the steps of any method in the foregoing method embodiment.

Figure 10:
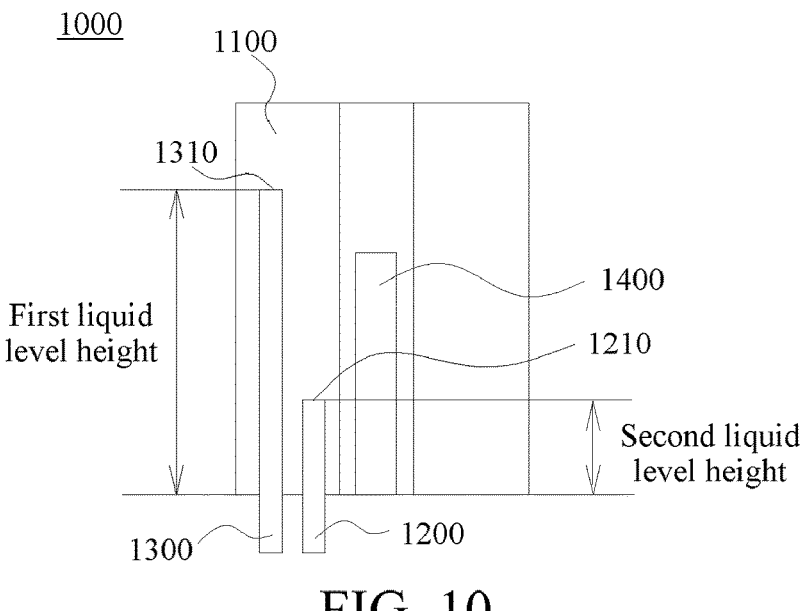
FIG. 10 is a schematic structural diagram of a first embodiment of a liquid storage assembly according to a second example of the present invention.

An electronic vaporization apparatus according to a second example of the present invention is described below. In the electronic vaporization apparatus, a remaining volume of to-be-vaporized liquid stored in a liquid storage cavity is detected based on detection for resistance. FIG. 10 is a structure of a first embodiment of a liquid storage assembly according to the second example of the present invention. The liquid storage assembly 1000 includes a liquid storage cavity 1100, a detection element 1300, a reference element 1200, and a vaporization core 1400.

The liquid storage cavity 1100 is configured to store to-be-vaporized liquid. The to-be-vaporized liquid in the liquid storage cavity 1100 can be guided into the vaporization core 1400 and heated and vaporized in the vaporization core 1400 to form an aerosol to be used by a user. In this embodiment, the liquid storage cavity 1100 surrounds the vaporization core 1400. In other embodiments, the liquid storage cavity 1100 may be arranged on one side of the vaporization core 1400.

The detection element 1300 includes a first conductive port 1310 used as a detection electrode. The first conductive port 1310 is provided in the liquid storage cavity 1100. A position where the first conductive port 1310 is located corresponds to a first liquid level height. That is, when a liquid level height of liquid in the liquid storage cavity 1100 is greater than or equal to the first liquid level height, the detection element 1300 may be in conductive connection to the to-be-vaporized liquid in the liquid storage cavity 1100 through the first conductive port 1310. When the liquid level height of the liquid in the liquid storage cavity 1100 is less than the first liquid level height, the detection element 1300 is insulated from the to-be-vaporized liquid in the liquid storage cavity 1100.

The reference element 1200 includes a second conductive port 1210 used as a reference electrode, where the second conductive port 1210 is arranged in the liquid storage cavity 1100. A position where the second conductive port 1210 is located corresponds to a second liquid level height. That is, when the liquid level height of the liquid in the liquid storage cavity 1100 is greater than or equal to the second liquid level height, the reference element 1200 may be in conductive connection to the to-be-vaporized liquid in the liquid storage cavity 1100 through the second conductive port 1210. When the liquid level height of the liquid in the liquid storage cavity 1100 is less than the second liquid level height, the reference element 1200 is insulated from the to-be-vaporized liquid in the liquid storage cavity 1100.

The detection element 1300 and reference element 1200 may be in a strip shape or a bar shape, or may be in other shapes, which is not limited in this application.

The detection element 1300 and the reference element 1200 may also be referred to as a first detection terminal and a second detection terminal. If one of the first detection terminal and the second detection terminal is the reference element, the other one is the detection element. The detection terminals may be in such a way that parts with conductive ports extend into the liquid storage cavity 1100, and other parts are arranged outside the liquid storage cavity 1100. Or the detection terminals are completely arranged in the liquid storage cavity 1100, as long as the conductive ports of the detection terminals are located at corresponding liquid level height positions of the liquid storage cavity 1100.

The detection element 1300 and the reference element 1200 extend into the liquid storage cavity 1100 from one side in a first direction. The first direction may be a length direction or a width direction of the liquid storage cavity 1100. Certainly, the first direction may also be another direction in which extending into the liquid storage cavity 1100 may be achieved. In this embodiment, the detection element 1300 and the reference element 1200 extend into the liquid storage cavity 1100 from one side in the first direction and extend towards the other side of the liquid storage cavity 1100 in the first direction. For example, the detection terminals may extend into the liquid storage cavity 1100 from one side in the longitudinal direction and extend towards the other side of the liquid storage cavity 1100 in the longitudinal direction. The detection terminals may also extend into the liquid storage cavity 1100 from one side in the transverse direction and extend towards the other side of the liquid storage cavity 1100 in the transverse direction. In another embodiment, the detection element 1300 and the reference element 1200 may both perform extending-in from one side in a length direction or a width direction. Or, one of the detection element 1300 and the reference element 1200 performs extending-in from one side in the length direction, and the other one of the detection element and the reference element performs extending-in from one side in the width direction.

The conductive ports may be located at end portions of the detection terminals and may also be located at positions of middle sections of the detection terminals. In this embodiment, the first conductive port 1310 is located at a tail end of the detection element 1300 in an extending direction. The second conductive port 1210 is located at a tail end of the reference element 1200 in an extending direction. In another embodiment, the first conductive port 1310 may be located at a middle section of the detection element 1300 in an extending direction. The second conductive port 1210 may be located at a middle section of reference element 1200 in an extending direction. Positions in the detection terminals where the conductive ports are located not limited to several positions mentioned by the present application and may be other positions, as long as the conductive ports of the detection terminals are located in corresponding liquid level height positions of the liquid storage cavity 1100.

Only the conductive ports of the detection terminals can be in conductive connection to the to-be-vaporized liquid in the liquid storage cavity 1100. Outer surfaces of parts of the detection terminals except the conductive ports are insulated from the to-be-vaporized liquid in the liquid storage cavity 1100. In this embodiment, each detection terminal may include a metal conductor. Meanwhile, an outer surface of one part of each metal conductor is provided with an insulating layer. An outer surface of the other part of each metal conductor is exposed to serve as the corresponding conductive port.

In an embodiment, a side surface of the detection element 1300 located in the liquid storage cavity 1100 is insulated. Meanwhile, a cross section (an end surface) of a port in one end of the detection element 1300 located in the liquid storage cavity 1100 is conductive so as to form the first conductive port 1310. A side surface of the reference element 1200 located in the liquid storage cavity 1100 is insulated. Meanwhile, a cross section (an end surface) of a port in one end of the reference element 1200 located in the liquid storage cavity 1100 is conductive so as to form the second conductive port 1210.

A technology for setting the side surfaces of the detection terminals to be insulated and the end surfaces to be conductive to serve as the conductive ports is simple, and it can be accurately achieved that when a liquid level of a solution in the liquid storage cavity 1100 reaches heights of the cross sections of the detection terminals in the liquid storage cavity 1100, the solution in the liquid storage cavity 1100 communicates with the detection terminals.

Figure 11:
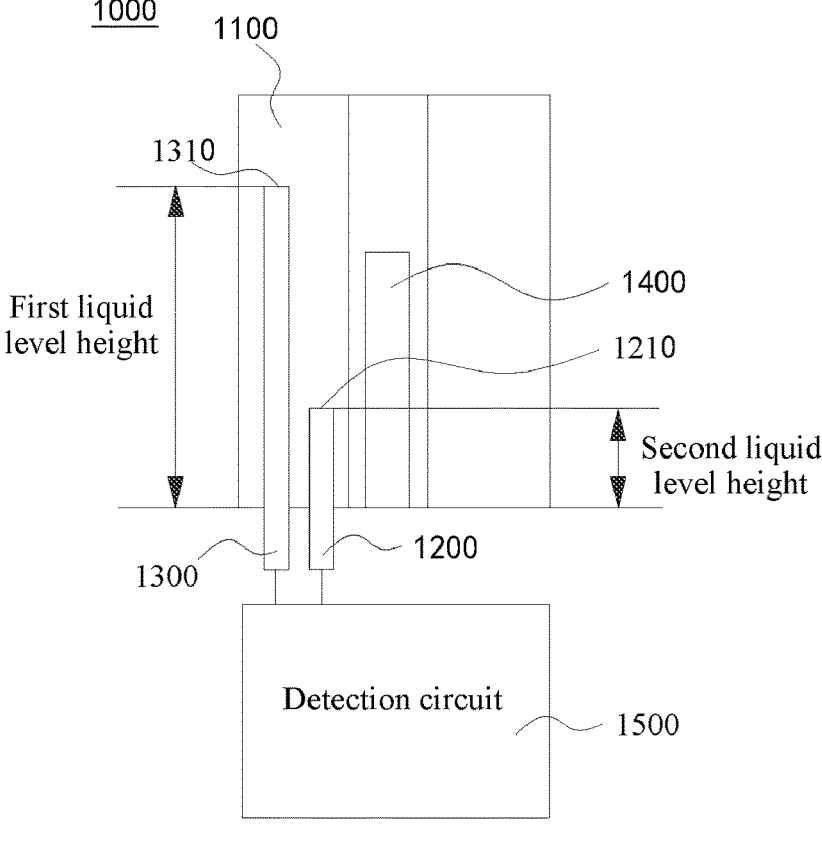
FIG. 11 is a schematic structural diagram of a second embodiment of the liquid storage assembly according to the second example of the present invention.

The first conductive port 1310 and the second conductive port 1210 are configured to be electrically connected to a detection circuit 1500. As shown in FIG. 11, FIG. 11 is a schematic structural diagram of a second embodiment of a liquid storage assembly 1000 according to the second example of the present invention. The liquid storage assembly 1000 may include a detection circuit 1500. The detection circuit 1500 of the liquid storage assembly 1000 is electrically connected to a first conductive port 1310 and a second conductive port 1210. Certainly, the liquid storage assembly 1000 may not include the detection circuit 1500. The first conductive port 1310 and the second conductive port 1210 may be electrically connected to an external detection circuit 1500.

The detection circuit 1500 may be directly electrically connected to the first conductive port 1310 and the second conductive port 1210 and may also be electrically connected to partial detection terminals arranged outside the liquid storage cavity 1100 so as to be electrically connected to the conductive ports in the liquid storage cavity 1100 through the metal conductors in the detection terminals. For example, a port in one end of each of the detection element 1300 and the reference element 1200 located outside the liquid storage cavity 1100 may be conductive. The detection circuit 1500 is connected to the port in one end of each of the two detection terminals located outside the liquid storage cavity 1100 so as to achieve electric connection with the first conductive port 1310 and the second conductive port 1210.

The first conductive port 1310 and the second conductive port 1210 are electrically connected to the detection circuit 1500, so that the detection circuit 1500 may detect a resistance value of the to-be-vaporized liquid in the liquid storage cavity 1100 through the first conductive port 1310 and the second conductive port 1210, so as to determine the remaining volume of the to-be-vaporized liquid.

It should be noted that, a first liquid level height corresponding to the detection element 1300 is not equal to a second liquid level height corresponding to the reference element 1200. That is, the first conductive port 1310 and the second conductive port 1210 correspond to different liquid level heights. The liquid level heights of the first conductive port 1310 and the second conductive port 1210 may be adjusted by setting lengths of the detection element 1300 and the reference element 1200 to be different.

By setting the first liquid level height and the second liquid level height to be different, when the remaining volume of the to-be-vaporized liquid in the liquid storage cavity 1100 is different, resistance values of the to-be-vaporized liquid detected by the detection circuit 1500 through the two electrically-connected detection terminals are different, so that a state of the remaining volume of the to-be-vaporized liquid in the liquid storage cavity 1100 can be determined.

For example, the first liquid level height may be set as a liquid level height when the liquid storage cavity 1100 is full of liquid or approaches full filling. In other words, the first conductive port 1310 may be arranged close to a top wall of the liquid storage cavity 1100. The second liquid level height is a liquid level height when the remaining volume of the liquid in the liquid storage cavity 1100 is less or no liquid is contained in the liquid storage cavity. In other words, the second conductive port 1210 may be arranged close to a bottom wall of the liquid storage cavity 1100.

Through such a setting manner, when the liquid level of the liquid in the liquid storage cavity 1100 is lower than the second liquid level height, the first conductive port 1310 and the second conductive port 1210 are both insulated from the liquid in the liquid storage cavity 1100. In other words, the detection element 1300 and the reference element 1200 are not in conductive connection to the liquid in the liquid storage cavity 1100. The resistance values of to-be-vaporized liquid detected by the detection circuit 1500 through the first conductive port 1310 and the second conductive port 1210 are infinite (equivalent to open circuit of the detection terminals) so that a small liquid remaining volume or no liquid in the liquid storage cavity 1100 may be determined. In other words, the remaining volume of the to-be-vaporized liquid is determined as zero, namely no oil (that is, the first remaining volume), and the user needs to be reminded to supplement the to-be-vaporized liquid.

When the liquid level of the liquid in the liquid storage cavity 1100 is higher than the first liquid level height and the second liquid level height, the first conductive port 1310 and the second conductive port 1210 are both in conductive connection to the liquid in the liquid storage cavity 1100. The to-be-vaporized liquid detected by the detection circuit 1500 through the first conductive port 1310 and the second conductive port 1210 has a certain resistance value so that it can be determined that the remaining volume of the liquid in the liquid storage cavity 1100 is full (that is, the third remaining volume).

When the liquid level of the liquid in the liquid storage cavity 1100 is higher than or equal to the second liquid level height and lower than the first liquid level height, the first conductive port 1310 is insulated from the liquid in the liquid storage cavity 1100, and the second conductive port 1210 is in conductive connection to the liquid in the liquid storage cavity 1100. A resistance value of the to-be-vaporized liquid detected by the detection circuit 1500 through the first conductive port 1310 is infinite, and the to-be-vaporized liquid detected by the detection circuit through the second conductive port 1210 has a certain resistance value so that it can be determined that the remaining volume of the liquid in the liquid storage cavity 1100 is between no oil and full oil (half oil, that is, the second remaining volume).

In another embodiment, a first liquid level height and a second liquid level height may be set according to needs. For example, it may be set that when the remaining volume of the to-be-vaporized liquid is 80% or more of a volume of the liquid storage cavity 1100, it is considered that a remaining volume state of the liquid is the third remaining volume (full oil), and therefore the first liquid level height is a liquid level height when the remaining volume of the to-be-vaporized liquid accounts for 80% of the volume of the liquid storage cavity 1100. When the remaining volume of the to-be-vaporized liquid accounts for 20% or less of the volume of the liquid storage cavity 1100, it is considered that the remaining volume state of the liquid is the first remaining volume (no oil), and therefore the second liquid level height is a liquid level height when the remaining volume of the to-be-vaporized liquid accounts for 20% of the volume of the liquid storage cavity 1100.

Compared with the prior art, in the liquid storage assembly 1000 provided by this application, since the liquid storage cavity 1100 is provided with the two conductive ports, namely the first conductive port 1310 and the second conductive port 1210, and the liquid storage cavity 1100 is provided with a detection electrode and a reference electrode, when the detection circuit 1500 detects the to-be-vaporized liquid, the remaining volume of the to-be-vaporized liquid can be determined according to a relative value of the detection electrode and the reference electrode. Detection of the remaining volume of the to-be-vaporized liquid is simple in design and low in cost, and the remaining volume is determined in a manner of comparing the two detection terminals, so that a situation in which the detection precision is influenced by the detection circuit 1500 due to a change in the resistance value of the to-be-vaporized liquid in the liquid storage cavity 1100 is avoided, and the detection result is not likely to cause an erroneous determination.

Figure 12:
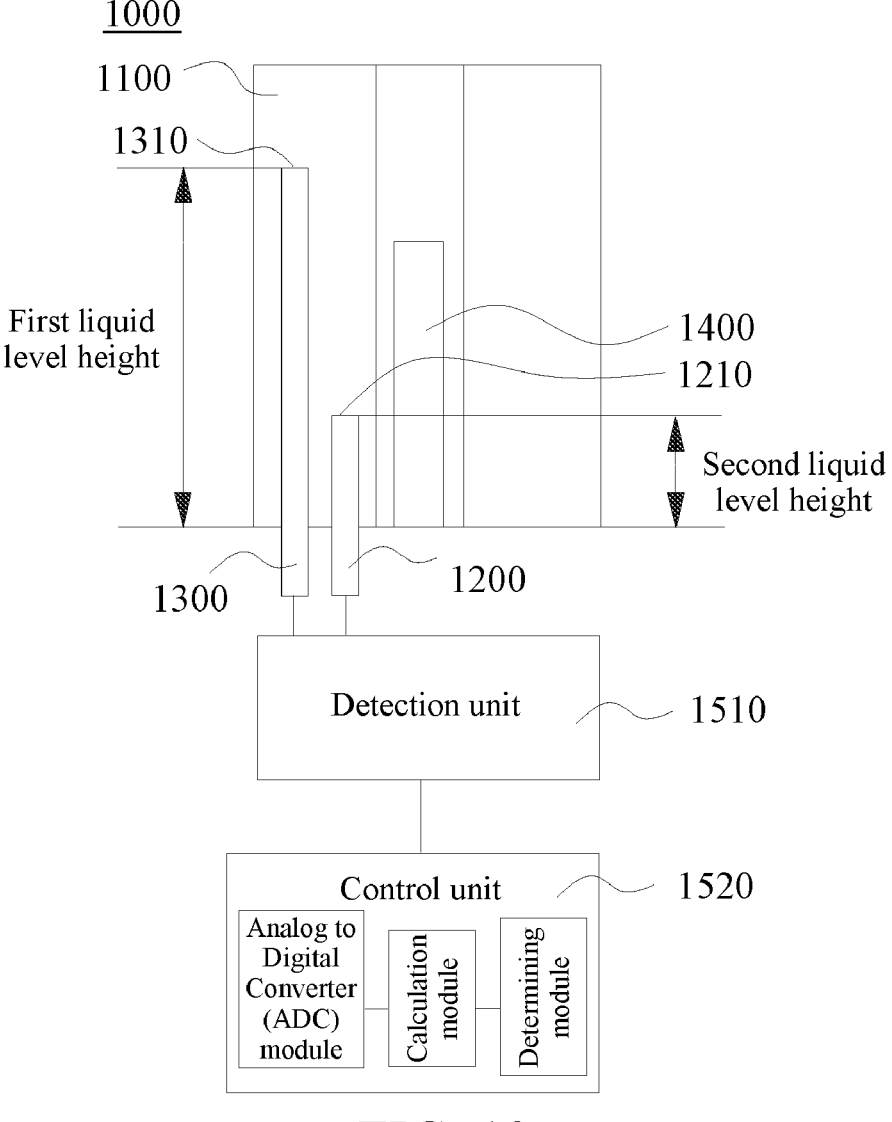
FIG. 12 is a schematic structural diagram of a third embodiment of the liquid storage assembly according to the second example of the present invention.

Referring to FIG. 12, FIG. 12 is a schematic structural diagram of a third embodiment of the liquid storage assembly 1000 according to the second example of the present invention. The detection circuit 1500 includes a detection module 1510 and a control module 1520.

The detection module 1510 is electrically connected to a first conductive port 1310 and a second conductive port 1210. Specifically, the detection module 1510 acquires a first electrical signal by detecting the first conductive port 1310, and acquires a second electrical signal by detecting a second conductive port 1210. The control module 1520 is connected to the detection module 1510. The control module 1520 may determine a first resistance value of to-be-vaporized liquid according to the first electrical signal, determine a second resistance value of the to-be-vaporized liquid according to the second electrical signal, and determine a remaining volume of the to-be-vaporized liquid according to the first resistance value and the second resistance value.

Specifically, the control module 1520 has an Analog to Digital Converter (ADC) module, a calculation module, and a determining module. The ADC module may convert analog signals into digital signals. The ADC module may determine a first voltage value according to the first electrical signal. The calculation module may calculate the first resistance value of the to-be-vaporized liquid according to the first voltage value. Similarly, the ADC module may determine a second voltage value according to the second electrical signal, and the calculation module may calculate the second resistance value of the to-be-vaporized liquid according to the second voltage value.

In this embodiment, as shown in FIG. 12, the determining module may determine the remaining volume of the to-be-vaporized liquid according to the first resistance value and the second resistance value. In this embodiment, the first liquid level height is greater than the second liquid level height. It may be set that when the resistance value is greater than or equal to a preset threshold, it is considered that the liquid is insulated from the conductive ports, and when the resistance value is less than the preset threshold, it is considered that the liquid communicates with the conductive ports. For example, when the first resistance value is greater than or equal to 1 MΩ, it is considered that the to-be-vaporized liquid in the liquid storage cavity 1100 is insulated from the first conductive port 1310, and when the first resistance value is less than 1 MΩ, it is considered that the to-be-vaporized liquid in the liquid storage cavity 1100 is in conductive connection to the first conductive port 1310.

Specifically, when the determining module determines that both the first resistance value and the second resistance value are greater than or equal to the preset threshold, that is, the to-be-vaporized liquid is insulated from the first conductive port 1310 and the second conductive port 1210, the remaining volume of the to-be-vaporized liquid is determined to the first remaining volume (no oil).

When the determining module determines that the first resistance value is greater than or equal to the preset threshold and the second resistance value is less than the preset threshold, that is, the to-be-vaporized liquid is insulated from the first conductive port 1310 and is in conductive connection to the second conductive port 1210, the remaining volume of the to-be-vaporized liquid is determined to be the second remaining volume (half oil).

When the determining module determines that both the first resistance value and the second resistance value are less than the preset threshold, that is, the to-be-vaporized liquid is in conductive connection to the first conductive port 1310 and the second conductive port 1210, the remaining volume of the to-be-vaporized liquid is determined to be the third remaining volume (full oil).

A manner for determining the remaining volume of the to-be-vaporized liquid through the first resistance value and the second resistance value is simple, and compared with a manner for determining the remaining volume of the to-be-vaporized liquid through a resistance value, the problem that a detection result is inaccurate due to fluctuation of resistance values of the to-be-vaporized liquid is solved. The detection manner is not likely to cause a wrong determining result, and therefore usage experience of the user is improved.

In an implementation, the liquid storage assembly 1000 further includes an indication module. The indication module is connected to the determining module, and configured to indicate the remaining volume of the to-be-vaporized liquid determined by the control module 1520. The indication module may be, for example, a display window, a display screen, an indicator lamp, or the like. The indication module may provide a remaining volume result of the to-be-vaporized liquid determined by the control module 1520 to the user so as to indicate the user about whether the to-be-vaporized liquid needs to be supplied into the liquid storage assembly 1000 or not.

Figure 13:
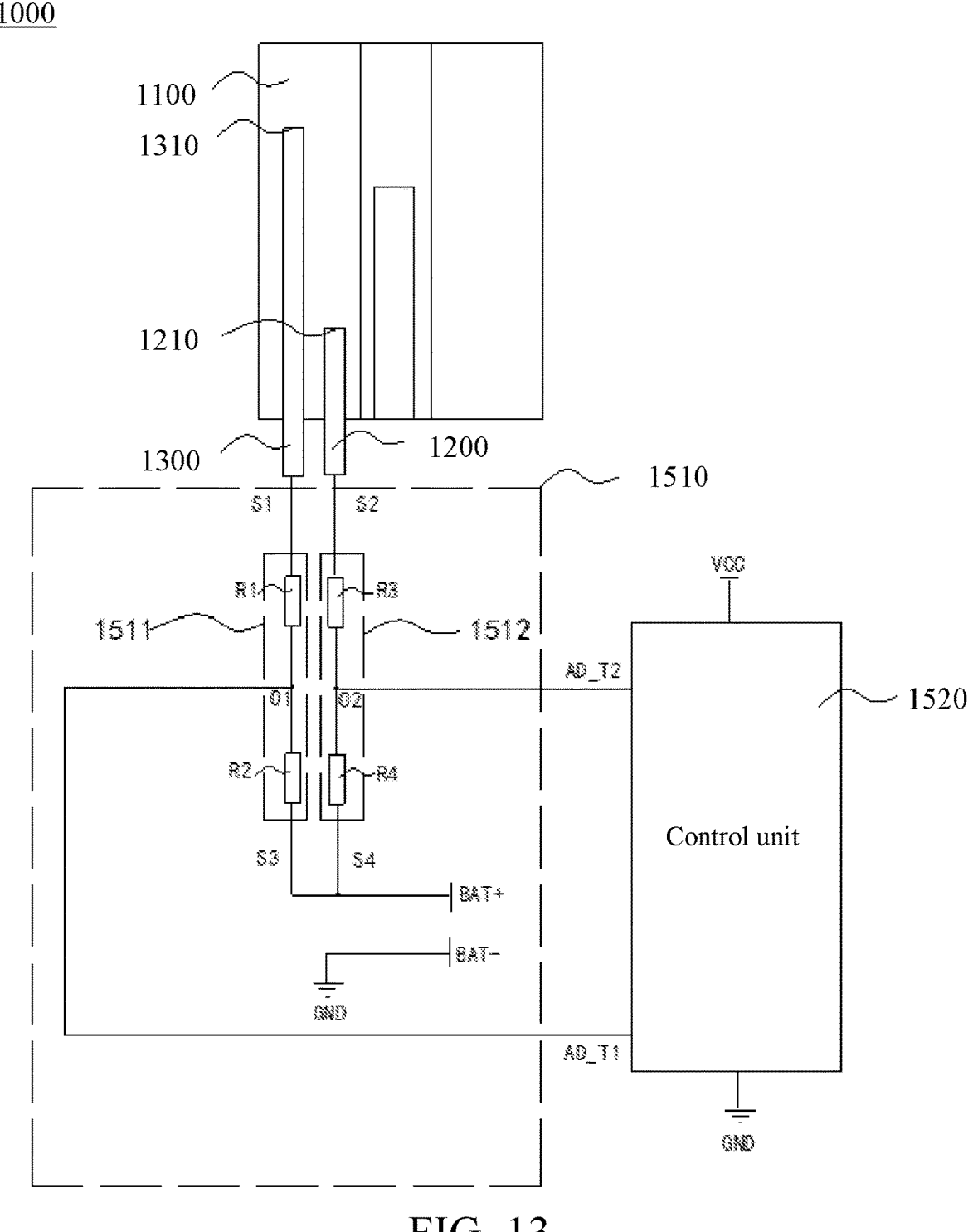
FIG. 13 is a schematic structural diagram of a fourth embodiment of the liquid storage assembly according to the second example of the present invention.

Referring to FIG. 13, FIG. 13 is a schematic structural diagram of a fourth embodiment of the liquid storage assembly 1000 of according to the second example of the present invention. A detection module 1510 includes a first voltage dividing unit 1511 and a second voltage dividing unit 1512.

A first end S3 of the first voltage dividing unit 1511 is configured to input a set voltage, and a second end S1 of the first voltage dividing unit 1511 is electrically connected to a first conductive port 1310. A first end S4 of the second voltage dividing unit 1512 is configured to input a set voltage, and a second end S2 of the second voltage dividing unit 1512 is electrically connected to a second conductive port 1210. Specifically, the set voltage may be a voltage of a power supply. A positive pole of the power supply is connected to the first end S3 of the first voltage dividing unit 1511 and the first end S4 of the second voltage dividing unit 1512. A negative pole of the power supply is connected to a ground (GND). In this embodiment, a negative pole of a vaporization core 1400 serves as a GND of the detection module 1510.

A first detection end AD_T1 of a control module 1520 is connected to a first voltage dividing node O1 of the first voltage dividing unit 1511 so as to acquire a first electrical signal of the first voltage dividing node O1. A second detection end AD_T2 of the control module 1520 is connected to a second voltage dividing node O2 of the second voltage dividing unit 1512 so as to acquire a second electrical signal of the second voltage dividing node O2. An ADC module of the control module 1520 may collect the first electrical signal and the second electrical signal at a certain frequency through the first detection end AD_T1 and the second detection end AD_T2 so as to determine a first voltage value and a second voltage value according to the first electrical signal and the second electrical signal.

Each voltage dividing unit may be a voltage dividing circuit formed by connecting at least two resistors in series. Each voltage dividing node may be a connection node between every two adjacent resistors. For example, in this embodiment, the first voltage dividing unit 1511 and the second voltage dividing unit 1512 are both voltage dividing circuits formed by respectively connecting two resistors in series.

The first voltage dividing unit 1511 includes a first resistor R1 and a second resistor R2. A first end of the first resistor R1 is electrically connected to the first conductive port 1310. A second end of the first resistor R1 is connected to a first end of the second resistor R2. The first end of the second resistor R2 is connected to the second end of the first resistor R1. A second end of the second resistor R2 inputs a set voltage. The first voltage dividing node O1 is a connection node between the first resistor R1 and the second resistor R2.

The second voltage dividing unit 1512 includes a third resistor R3 and a fourth resistor R4. A first end of the third resistor R3 is electrically connected to the second conductive port 1210. A second end of the third resistor R3 is connected to a first end of the fourth resistor R4. The first end of the fourth resistor R4 is connected to the second end of the third resistor R3. A second end of the fourth resistor R4 inputs a set voltage. The second voltage dividing node O2 is a connection node between the third resistor R3 and the fourth resistor R4.

The control module 1520 is connected to the voltage dividing nodes of the voltage dividing units, and the voltage dividing units are connected to detection terminals, so that when the detection terminals and liquid in a liquid storage cavity 1100 are in conductive connection instead of electric insulation, equivalent resistance of the liquid in the liquid storage cavity 1100 and the voltage dividing units jointly perform voltage dividing, and accordingly electrical signals at the voltage dividing nodes of the voltage dividing units change. When the detection terminals and the liquid in the liquid storage cavity 1100 are electrically insulated instead of conductive connection, that is, the equivalent resistance of the liquid in the liquid storage cavity 1100 is disconnected from the voltage dividing units, accordingly, the electrical signals at the voltage dividing nodes of the voltage dividing units change. Accordingly, the control module 1520 may calculate a resistance value (infinity or a certain resistance value) of the to-be-vaporized liquid detected through the first conductive port 1310 and the second conductive port 1210 according to changes of the electrical signals at the voltage dividing nodes, so as to determine the remaining volume of the to-be-vaporized liquid.

Figure 14:
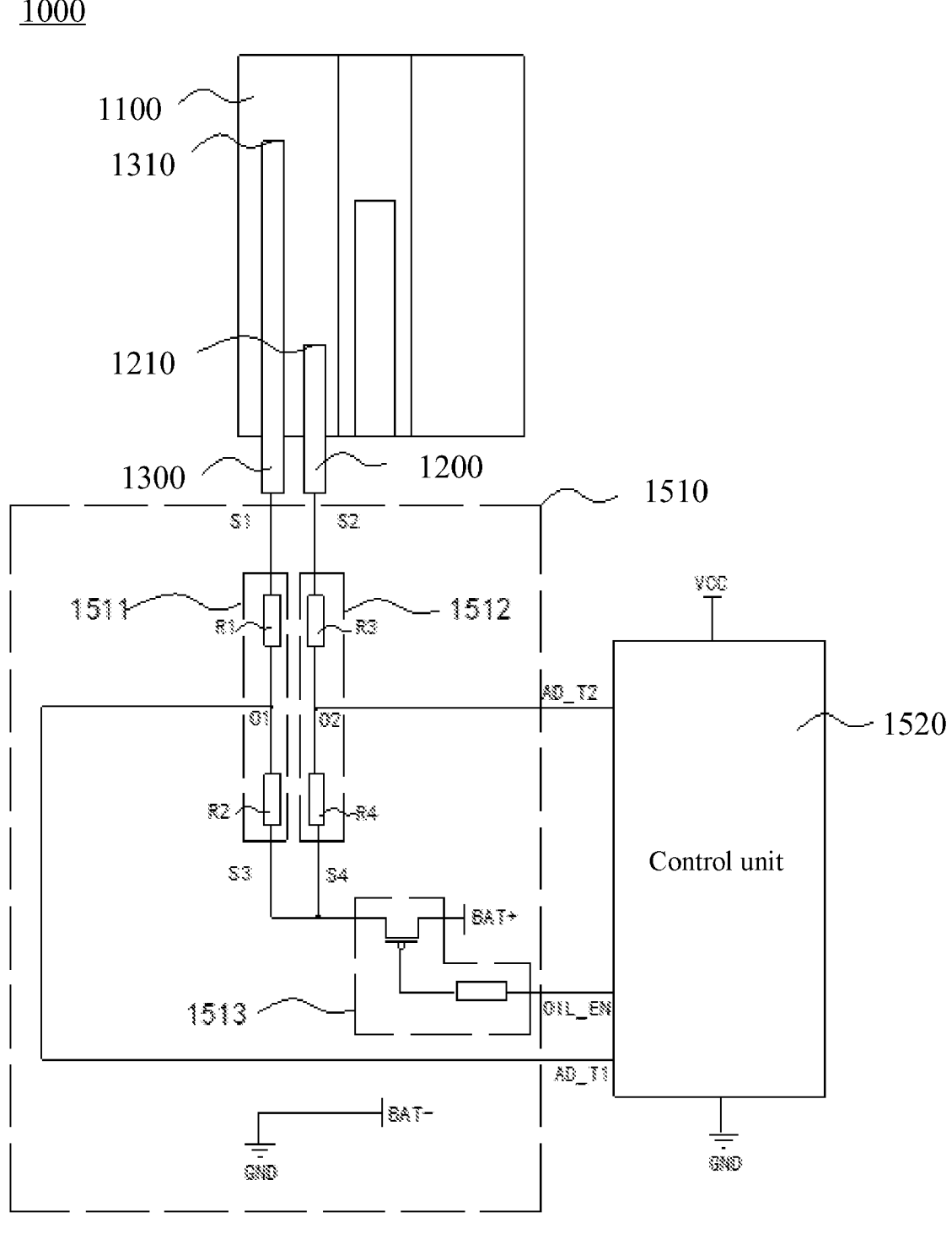
FIG. 14 is a schematic structural diagram of a fifth embodiment of the liquid storage assembly according to the second example of the present invention.

Referring to FIG. 14, FIG. 14 is a schematic structural diagram of a fifth embodiment of the liquid storage assembly 1000 according to the second example of the present invention. In an embodiment, a detection module 1510 further includes a switching unit 1513. The switching unit 1513 is configured to control a set voltage to be conveyed to voltage dividing units. The switching unit 1513 may be, for example, a P type transistor or an N type transistor. This embodiment takes the P type transistor as an example.

An input end of the switching unit 1513 is configured to input the set voltage. An output end of the switching unit 1513 is connected to a first end S3 of a first voltage dividing unit 1511 and a first end S4 of a second voltage dividing unit 1512. A control end of the switching unit 1513 is connected to a control enabling end OIL_EN of the control module 1520. Specifically, when the control enabling end OIL_EN receives an enabling signal, a low level is inputted to the control end of the switching unit 1513 so that the switching unit 1513 may be turned on. The set voltage is inputted to the first end S3 of the first voltage dividing unit and the first end S4 of the second voltage dividing unit 1512. Accordingly, the control module 1520 can determine a first resistance value and a second resistance value of to-be-vaporized liquid according to electrical signals of voltage dividing nodes and determine a remaining volume of the to-be-vaporized liquid according to the first resistance value and the second resistance value.

In an implementation, the control module 1520 turns on the switching unit 1513 when the remaining volume of the to-be-vaporized liquid needs to be detected, and turns off the switching unit 1513 when the remaining volume of the to-be-vaporized liquid does not need to be detected. For example, the switching unit 1513 may be turned on after a vaporizer is started, and the switching unit 1513 is turned off after the vaporizer is turned off. Or, the switching unit 1513 may be turned on after the control module 1520 receives a detection instruction from a user, and the switching unit 1513 is turned off after a stop instruction from the user is received. Or, the switching unit 1513 is automatically turned off in a period of time after the switching unit 1513 is turned on.

By arranging the switching unit 1513 in the detection module 1510, when the remaining volume of the to-be-vaporized liquid in the liquid storage cavity 1100 does not need to be detected, the switching unit 1513 may be turned off, to stop conveying a supply voltage to the detection module 1510, thereby improving circuit safety, and reducing energy waste.

Figure 15:
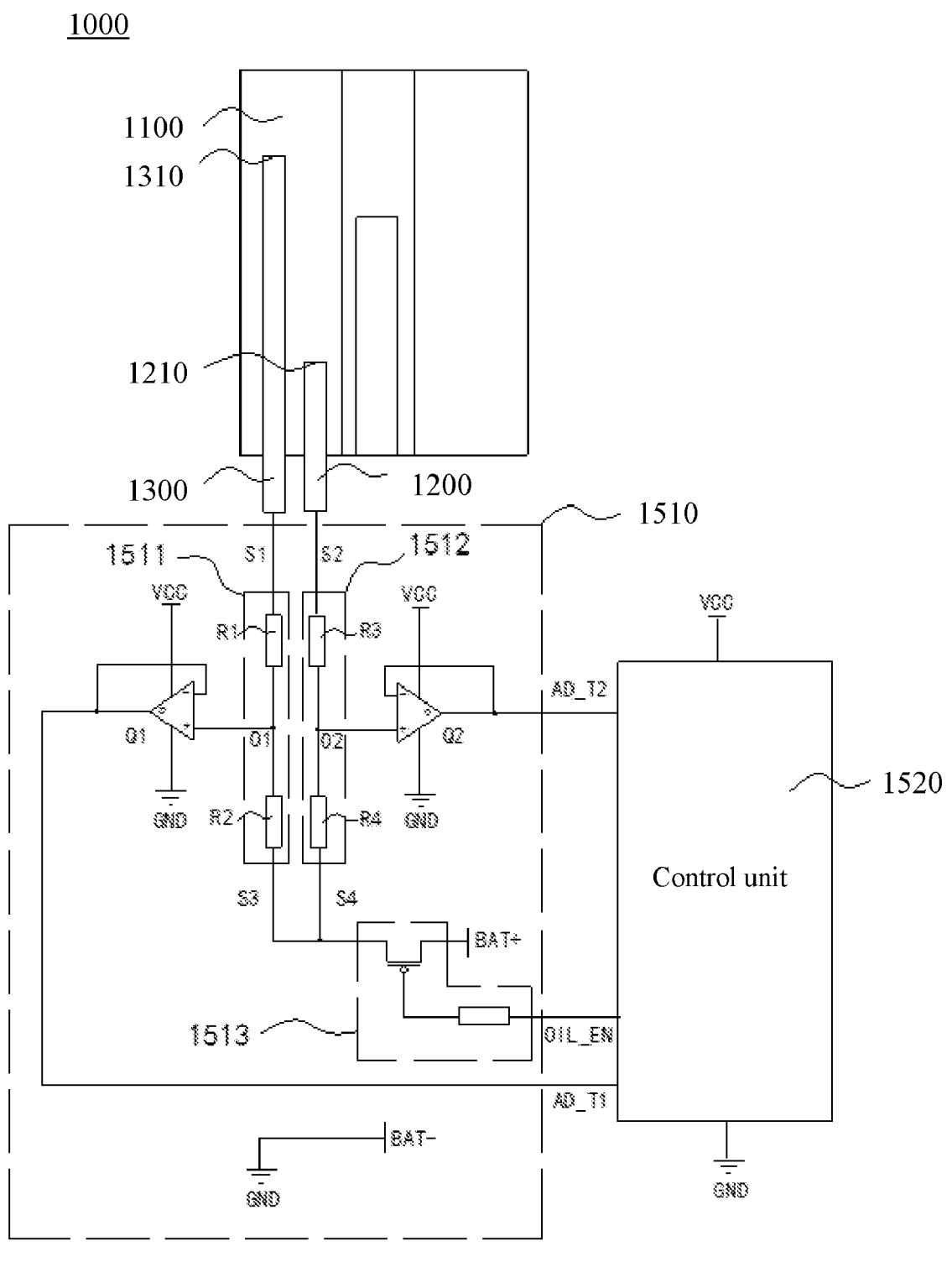
FIG. 15 is a schematic structural diagram of a sixth embodiment of the liquid storage assembly according to the second example of the present invention.

Referring to FIG. 15, FIG. 15 is a schematic structural diagram of a sixth embodiment of the liquid storage assembly 1000 of according to the second example of the present invention. A detection module 1510 further includes a first voltage follower Q1 and a second voltage follower Q2. An input end of the first voltage follower Q1 is connected to a first voltage dividing node O1. An output end of the first voltage follower Q1 is connected to a first detection end AD_T1 of a control module 1520. An input end of the second voltage follower Q2 is connected to a second voltage dividing node O2. An output end of the second voltage follower Q2 is connected to a second detection end AD_T2 of the control module 1520. By arranging the voltage followers in the control module 1520 and the voltage dividing units, mutual interference between the control module 1520 and the voltage dividing units may be isolated. In this case, a buffer function is achieved, and normal work of circuits is guaranteed.

Figure 16:
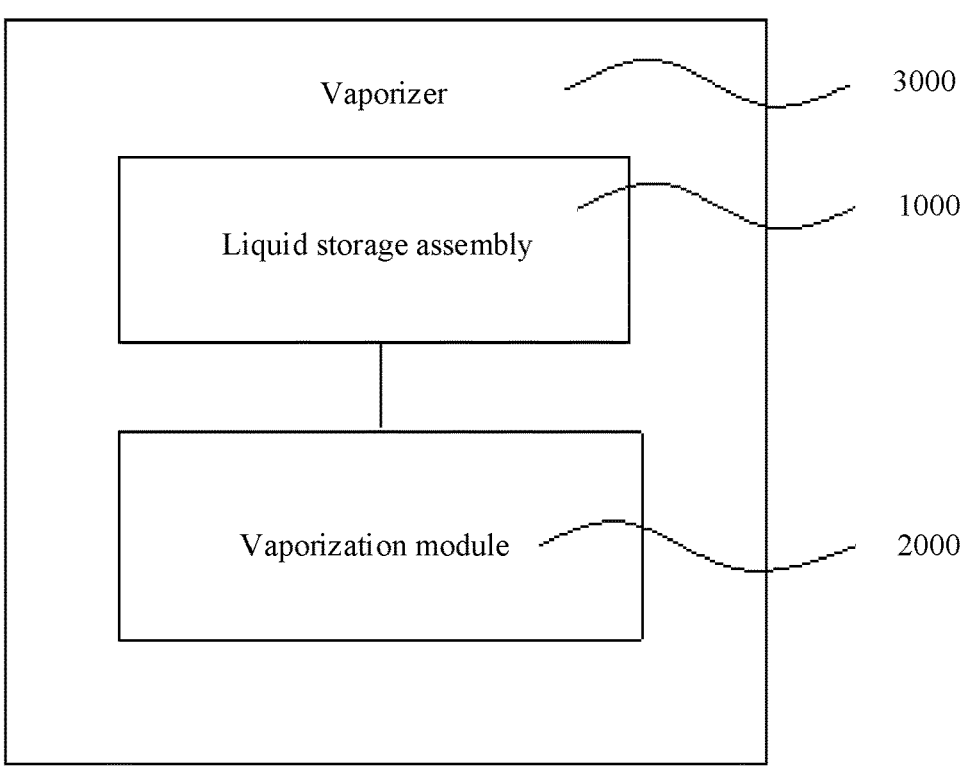
FIG. 16 is a block diagram of function modules of a vaporizer according to the second example of the present invention.

Referring to FIG. 16, FIG. 16 is a block diagram of function modules of a vaporizer 3000 according to the second example of the present invention. In this embodiment, a vaporizer 3000 is provided. The vaporizer 3000 is configured to store to-be-vaporized liquid and vaporize the to-be-vaporized liquid so as to form aerosol capable of being inhaled by a user. The vaporizer 3000 may be particularly applied to different fields such as medical treatment and an electronic aerosolization apparatus. In a specific embodiment, the vaporizer 3000 may be applied to the electronic aerosolization apparatus, and is configured to vaporize a to-be-vaporized substrate and generate aerosol to be sucked by a person. Certainly, in another embodiment, the vaporizer 3000 may also be applied to hair spray equipment so as to vaporize hair spray for hair fixing. Or, the vaporizer is applied to medical equipment for treating diseases of upper and lower respiratory systems so as to vaporize medical drugs.

The vaporizer 3000 includes a liquid storage assembly 1000 and a vaporization module 2000 which are electrically connected mutually.

For a specific structure and functions of the liquid storage assembly 1000, reference may be made to a specific structure and functions of the liquid storage assembly 1000 involved in any above embodiment, and same or similar technical effects can be achieved. Details are not described herein again.

The vaporization module 2000 includes an airflow guide member and a heating element. The to-be-vaporized liquid in the liquid storage assembly 1000 may be guided to the heating element through the airflow guide member. After being powered on, the heating element can vaporize the to-be-vaporized liquid to form the aerosol.

In an embodiment, the vaporizer 3000 may further include a detection circuit. For a specific structure and functions of the detection circuit, reference may be made to the detection circuits in the second embodiment to the sixth embodiment of the liquid storage assembly 1000, and details are not described herein again. In this embodiment, the liquid storage assembly 1000 in the vaporizer 3000 may not include the detection circuit.

Figure 17:
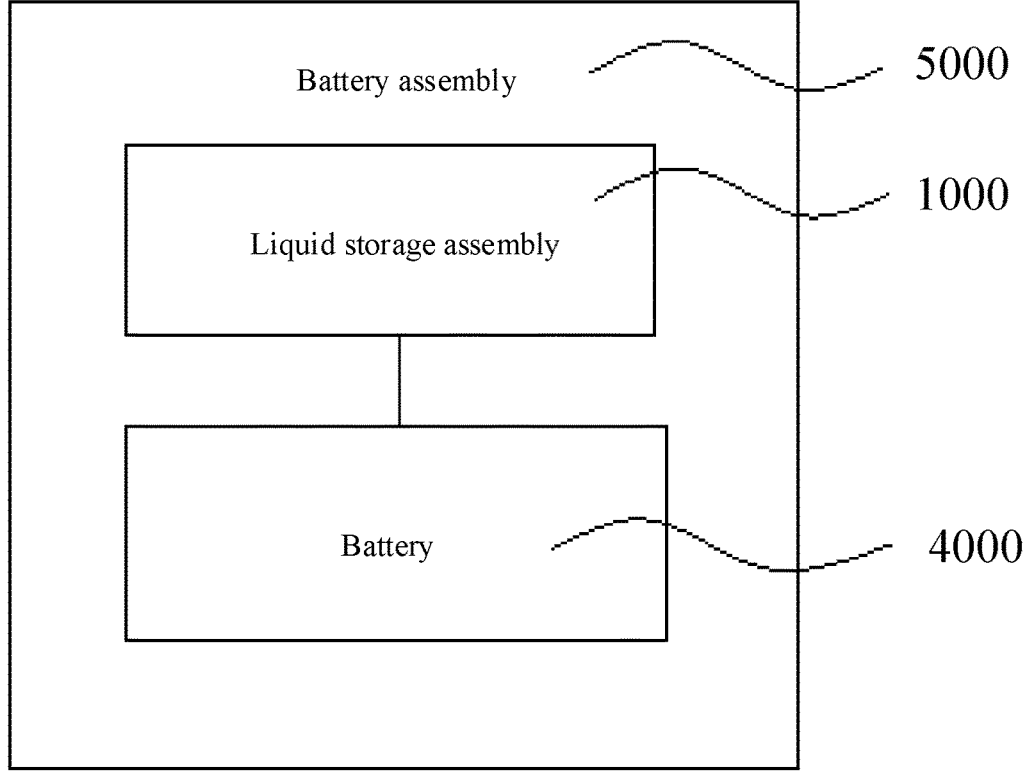
FIG. 17 is a block diagram of function modules of a battery assembly according to the second example of the present invention.

Referring to FIG. 17, FIG. 17 is a block diagram of function modules of a battery assembly according to the second example of the present invention. The battery assembly 5000 includes a liquid storage assembly 1000 and a battery 4000.

For a specific structure and functions of the liquid storage assembly 1000, reference may be made to a specific structure and functions of the liquid storage assembly 1000 involved in any above embodiment, and same or similar technical effects can be achieved. Details are not described herein again.

The battery is configured to supply power to the vaporizer 3000 so that the vaporizer 3000 can vaporize an aerosol-forming substrate to form aerosol.

In an embodiment, the battery assembly 5000 may further include a detection circuit. For a specific structure and functions of the detection circuit, reference may be made to the detection circuit in the liquid storage assembly 1000 above, and details are not described herein again. In this embodiment, the liquid storage assembly 1000 of the battery assembly 5000 may not include the detection circuit.

Referring to FIG. 18, FIG. 18 is a block diagram of function modules of an electronic vaporization apparatus according to the second example of the present invention. The electronic vaporization apparatus includes a liquid storage assembly 1000, a vaporization module 2000, and a battery 4000. For a specific structure and functions of the liquid storage assembly 1000, reference may be made to a specific structure and functions of the liquid storage assembly 1000 involved in any above embodiment, and same or similar technical effects can be achieved. Details are not described herein again.

The vaporization module 2000 is configured to vaporize to-be-vaporized liquid in the liquid storage assembly 1000. The battery 4000 is configured to supply power to the vaporizer 3000 and the liquid storage assembly 1000, so that the vaporizer 3000 may vaporize an aerosol-forming substrate to form aerosol.

In an embodiment, the electronic vaporization apparatus may include a detection circuit. For a specific structure and functions of the detection circuit, reference may be made to the detection circuit in the liquid storage assembly 1000 above, and details are not described herein again. In this embodiment, the liquid storage assembly 1000 of the electronic vaporization apparatus may not include the detection circuit.

Referring to FIG. 19, FIG. 19 is a schematic flowchart of a remaining volume detection method for to-be-vaporized liquid according to the second example of the present invention. The remaining volume detection method is used for detecting remaining volume of to-be-vaporized liquid. The detection method may be applied to the above liquid storage assembly 1000, vaporizer 3000, battery assembly 5000, and electronic vaporization apparatus. In this embodiment, the remaining volume detection method includes the following steps:

Step S21: Acquire a first electrical signal of a first conductive port, and acquire a second electrical signal of a second conductive port.

Specifically, a first voltage dividing node O1 of a first voltage dividing unit 1511 and a second voltage dividing node O2 of a second voltage dividing unit 1512 may be acquired at a certain frequency so as to acquire the first electrical signal and the second electrical signal.

Step S22: Determine a first resistance value of the to-be-vaporized liquid according to the first electrical signal, and determine a second resistance value of the to-be-vaporized liquid according to the second electrical signal.

Specifically, a first voltage value is determined according to the first electrical signal, and the first resistance value of the to-be-vaporized liquid is calculated according to the first voltage value. A second voltage value is determined according to the second electrical signal, and the second resistance value of the to-be-vaporized liquid is calculated according to the second voltage value.

Step S23: Determine a remaining volume of the to-be-vaporized liquid according to the first resistance value and the second resistance value.

Specifically, it may be set that when the resistance value is greater than or equal to a preset threshold, it is considered that the liquid is insulated from detection terminals, and when the resistance value is less than the preset threshold, it is considered that the liquid communicates with the detection terminals. For example, when the first resistance value is greater than or equal to 1 M$\Omega$, it is considered that the to-be-vaporized liquid in the liquid storage cavity 1100 is insulated from the first conductive port 1310, and when the first resistance value is less than 1 M$\Omega$, it is considered that the to-be-vaporized liquid in the liquid storage cavity 1100 is in conductive connection to the first conductive port 1310.

Specifically, in an embodiment, a first liquid level height is greater than a second liquid level height. When it is determined that the first resistance value and the second resistance value are both greater than or equal to the preset threshold, that is, the to-be-vaporized liquid is insulated from the first conductive port 1310 and the second conductive port 1210, the remaining volume of the to-be-vaporized liquid is determined to be no oil.

When it is determined that the first resistance value is greater than or equal to the preset threshold and the second resistance value is less than the preset threshold, that is, the to-be-vaporized liquid is insulated from the first conductive port 1310 and is in conductive connection to the second conductive port 1210, the remaining volume of the to-be-vaporized liquid is determined to be in a half oil state.

When it is determined that the first resistance value and the second resistance value are both less than the preset threshold, that is, the to-be-vaporized liquid is in conductive connection to the first conductive port 1310 and the second conductive port 1210, the remaining volume of the to-be-vaporized liquid is determined to be full oil.

The two electrical signals are acquired through the first conductive port and the second conductive port, and the first resistance value and the second resistance value of the to-be-vaporized liquid are determined according to the two electrical signals. In addition, a manner of determining the remaining volume of the to-be-vaporized liquid through the first resistance value and the second resistance value is simple. Compared with a manner of determining a remaining volume of e-liquid through one resistance value, by using a manner of determining the remaining volume by comparing the two resistance values, a situation in which the detection precision is influenced due to a change in the resistance value of the to-be-vaporized liquid in the liquid storage cavity is avoided, and the detection result is not likely to cause an erroneous determination, thereby improving usage experience of the user.

A person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

In the description of this specification, references to descriptions of the terms "some embodiments", "other embodiments", "desirable embodiments", and the like. mean that a particular feature, structure, material, or characteristic described with reference to this embodiment or example is included in at least one embodiment or example of the present invention. In this specification, exemplary descriptions of the foregoing terms do not necessarily refer to the same embodiment or example.

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The foregoing embodiments only describe several implementations of the present invention, and the description is specific and detailed, but cannot therefore be understood as a limitation to the patent scope of the present invention. It should be noted that, a person of ordinary skill in the art may further make several variations and improvements without departing from the concept of the present invention, and these variations and improvements all fall within the protection scope of the present invention. Therefore, the protection scope of the patent of the present invention shall be subject to the appended claims.

Several aspects of the subject matter described in the present invention are described in the following numbered clauses:

Clause 1. An electronic vaporization apparatus, including:

a liquid storage cavity, configured to store to-be-vaporized liquid;

a reference element;

a first detection element, forming a first capacitor with the reference element;

a second detection element, forming a second capacitor with the reference element, where a distance between a bottom of the first detection element and a bottom of the liquid storage cavity is less than a distance between a bottom of the second detection element and the bottom of the liquid storage cavity;

a capacitance acquisition module, connected to the reference element, the first detection element, and the second detection element, and configured to acquire capacitance of the first capacitor, output a first electrical signal corresponding to the capacitance of the first capacitor, acquire capacitance of the second capacitor, and output a second electrical signal corresponding to the capacitance of the second capacitor; and a processing module, connected to the capacitance acquisition module, and configured to receive the first electrical signal and the second electrical signal, and determine a remaining volume of the to-be-vaporized liquid according to the first electrical signal and the second electrical signal.

Clause 2. The electronic vaporization apparatus according to clause 1, where the remaining volume of the to-be-vaporized liquid includes a first remaining volume, a second remaining volume, and a third remaining volume;

the processing module is further configured to: determine the remaining volume of the to-be-vaporized liquid to be the first remaining volume when a voltage of the first electrical signal is equal to a first voltage threshold and a voltage of the second electrical signal is equal to a second voltage threshold, where the first voltage threshold is the corresponding voltage of the first electrical signal when the first detection element is not in contact with the to-be-vaporized liquid in the liquid storage cavity, and the second voltage threshold is the corresponding voltage of the second electrical signal when the second detection element is not in contact with the to-be-vaporized liquid in the liquid storage cavity;

the processing module is further configured to determine the remaining volume of the to-be-vaporized liquid to be the second remaining volume when the voltage of the first electrical signal is greater than the first voltage threshold and the voltage of the second electrical signal is equal to the second voltage threshold; and the processing module is further configured to determine the remaining volume of the to-be-vaporized liquid to be the third remaining volume when the voltage of the first electrical signal is greater than the first voltage threshold and the voltage of the second electrical signal is greater than the second voltage threshold.

Clause 3. The electronic vaporization apparatus according to clause 1 or 2, where the capacitance acquisition module includes:

a first capacitor acquisition unit, connected to the first detection element, the reference element, and the processing module, and configured to acquire the capacitance of the first capacitor and output the first electrical signal to the processing module; and a second capacitor acquisition unit, connected to the second detection element, the reference element, and the processing module, and configured to acquire the capacitance of the second capacitor and output the second electrical signal to the processing module.

Clause 4. The electronic vaporization apparatus according to clause 1, further comprising a switch module and a power supply; and, where the processing module is connected to the switch module, and is further configured to output a first trigger signal to the switch module; and the switch module is connected to the capacitance acquisition module and the power supply module, and is configured to control the power supply module to supply power to the capacitance acquisition module according to the first trigger signal.

Clause 5. The electronic vaporization apparatus according to clause 4, where the switch module is aP-Channel enhancement-type MOSFET; and a drain electrode of the P-Channel enhancement-type MOSFET is connected to the capacitance acquisition module, a grid electrode of the P-Channel enhancement-type MOSFET is connected to the processing module, and a source electrode of the P-Channel enhancement-type MOSFET is connected to the power supply module.

Clause 6. The electronic vaporization apparatus according to any one clauses 1 to 5, where the processing module is a chip microcomputer.

Clause 7. The electronic vaporization apparatus according to clause 1, where the first detection element and the second detection element are metal sheets or metal meshes coated with insulation materials.

Clause 8. The electronic vaporization apparatus according to clause 1, where the first detection element and the second detection element are respectively adhered to inner side walls of the liquid storage cavity.

Clause 9. a remaining volume detection method for to-be-vaporized liquid, applicable to an electronic vaporization apparatus, and the method including:

acquiring a first electrical signal and a second electrical signal outputted by a capacitance acquisition module, where the first electrical signal corresponds to capacitance of a first capacitor acquired by the capacitance acquisition module; the second electrical signal corresponds to capacitance of a second capacitor acquired by the capacitance acquisition module; the first capacitor includes a first detection element and a reference element; the electronic vaporization apparatus comprises a liquid storage cavity, and the liquid storage cavity is configured to store to-be-vaporized liquid; the second capacitor includes a second detection element and the reference element; and a distance between a bottom of the first detection element and a bottom of the liquid storage cavity is less than a distance between a bottom of the second detection element and the bottom of the liquid storage cavity; and determining a remaining volume of the to-be-vaporized liquid in the liquid storage cavity according to the first electrical signal and the second electrical signal.

Clause 10. The remaining volume detection method for to-be-vaporized liquid according to clause 9, where a volume state of the to-be-vaporized liquid includes a first remaining volume, a second remaining volume, and a third remaining volume; and the step of determining the volume state of the to-be-vaporized liquid in the liquid storage cavity according to the first electrical signal and the second electrical signal includes:

determining the remaining volume of the to-be-vaporized liquid to be the first remaining volume when a voltage of the first electrical signal is equal to a first voltage threshold and a voltage of the second electrical signal is equal to a second voltage threshold, where the first voltage threshold is the corresponding voltage of the first electrical signal when the first detection element is not in contact with the to-be-vaporized liquid in the liquid storage cavity, and the second voltage threshold is the corresponding voltage of the second electrical signal when the second detection element is not in contact with the to-be-vaporized liquid in the liquid storage cavity;

determining the remaining volume of the to-be-vaporized liquid to be the second remaining volume when the voltage of the first electrical signal is greater than a first voltage threshold and the voltage of the second electrical signal is equal to the second voltage threshold; and determining the remaining volume of the to-be-vaporized liquid to be the third remaining volume when the voltage of the first electrical signal is greater than the first voltage threshold and the voltage of the second electrical signal is greater than the second voltage threshold.

Clause 11. a remaining volume detection device for to-be-vaporized liquid, applicable to an electronic vaporization apparatus, and the device including:

an electrical signal acquisition module, configured to acquire a first electrical signal and a second electrical signal outputted by a capacitance acquisition module, where the first electrical signal corresponds to capacitance of a first capacitor acquired by the capacitance acquisition module; the second electrical signal corresponds to capacitance of a second capacitor acquired by the capacitance acquisition module; the first capacitor includes a first detection element and a reference element; the electronic vaporization apparatus comprises a liquid storage cavity and the liquid storage cavity is configured to store to-be-vaporized liquid; the second capacitor includes a second detection element and the reference element; and a distance between a bottom of the first detection element and a bottom of the liquid storage cavity is less than a distance between a bottom of the second detection element and the bottom of the liquid storage cavity; and a to-be-vaporized liquid remaining volume determining module, configured to determine a remaining volume of the to-be-vaporized liquid in the liquid storage cavity according to the first electrical signal and the second electrical signal.

Clause 12. A computer device, including a memory and a processor, the memory storing a computer program executable by the processor; where the processor, upon executing the computer program, implementing the steps of the method according to any one of clauses 9 to 10.

Clause 13. A computer-readable storage medium, storing a computer program, the computer program is capable of being executed by a processor, to implement the steps of the method according to any one of clauses 9 to 10.

Clause 14. A liquid storage assembly, including:

a liquid storage cavity, configured to store to-be-vaporized liquid;

a detection element, including a first conductive port located in the liquid storage cavity;

a reference element, including a second conductive port located in the liquid storage cavity, where the detection element and the reference element extend into the liquid storage cavity from one side of the liquid storage cavity in a first direction; the first conductive port and the second conductive port correspond to different liquid level heights; and the first conductive port and the second conductive port are electrically connected to a detection circuit for the detection circuit to detect a resistance value of the to-be-vaporized liquid through the first conductive port and the second conductive port, to determine the remaining volume of the to-be-vaporized liquid.

Clause 15. The liquid storage assembly according to clause 14, where the detection element and the reference element extend in the first direction, a side surface of the detection element is insulated, and an end surface of one port of the detection element is conductive to form the first conductive port; and a side surface of the reference element is insulated, and an end surface of one port of the reference element is conductive to form the second conductive port.

Clause 16. The liquid storage assembly according to clause 14 or 15, where the liquid storage assembly further includes a detection circuit, and the detection circuit includes:

a detection module, electrically connected to the first conductive port and the second conductive port, and configured to acquire a first electrical signal by detecting the first conductive port, and acquire a second electrical signal by detecting the second conductive port; and a control module, connected to the detection module, and configured to determine a first resistance value of the to-be-vaporized liquid according to the first electrical signal, determine a second resistance value of the to-be-vaporized liquid according to the second electrical signal, and determine the remaining volume of the to-be-vaporized liquid according to the first resistance value and the second resistance value.

Clause 17. The liquid storage assembly according to clause 16, where the detection module includes:

a first voltage dividing unit, where a first end of the first voltage dividing unit is configured to input a set voltage, and a second end of the first voltage dividing unit is electrically connected to the first conductive port; and a second voltage dividing unit, where a first end of the second voltage dividing unit is configured to input a set voltage, and a second end of the second voltage dividing unit is electrically connected to the second conductive port; and the control module is connected to a first voltage dividing node of the first voltage dividing unit to acquire the first electrical signal, and the control module is connected to a second voltage dividing node of the second voltage dividing unit to acquire the second electrical signal.

Clause 18. The liquid storage assembly according to clause 17, where the detection module further includes:

a first voltage follower, where an input end of the first voltage follower is connected to the first voltage dividing node, and an output end of the first voltage follower is connected to the control module; and a second voltage follower, where an input end of the second voltage follower is connected to the second voltage dividing node, and an output end of the second voltage follower is connected to the control module.

Clause 19. The liquid storage assembly according to clause 17, where the detection module further includes:

a switching unit, where an input end of the switching unit is configured to input the set voltage, an output end of the switching unit is connected to the first end of the first voltage dividing unit and the first end of the second voltage dividing unit, and a control end of the switching unit is connected to the control module, where the control module turns on the switching unit when the remaining volume of the to-be-vaporized liquid is detected.

Clause 20. The liquid storage assembly according to clause 16, where a first liquid level height corresponding to the first conductive port is greater than a second liquid level height corresponding to the second conductive port; and the control module is configured to:

determine the remaining volume of the to-be-vaporized liquid to be zero, namely no oil when both the first resistance value and the second resistance value are greater than or equal to a preset threshold;

the control module is particularly configured to determine the remaining volume of the to-be-vaporized liquid to be half, namely half oil when the first resistance value is greater than or equal to the preset threshold and the second resistance value is less than the preset threshold; and the control module is particularly configured to determine the remaining volume of the to-be-vaporized liquid to be full, namely full oil when the first resistance value and the second resistance value are both less than the preset threshold.

Clause 21. A vaporizer, including:

the liquid storage assembly according to any one of clauses 14 to 21; and a vaporization module, configured to vaporize to-be-vaporized liquid in the liquid storage cavity.

clause 22. The vaporizer according to clause 21, where the liquid storage assembly is the liquid storage assembly according to clause 14 or 15; the vaporizer further includes a detection circuit, and the detection circuit includes:

a detection module, electrically connected to the first conductive port and the second conductive port, and configured to acquire a first electrical signal by detecting the first conductive port, and acquire a second electrical signal by detecting the second conductive port; and a control module, connected to the detection module, and configured to determine a first resistance value of the to-be-vaporized liquid according to the first electrical signal, determine a second resistance value of the to-be-vaporized liquid according to the second electrical signal, and determine the remaining volume of the to-be-vaporized liquid according to the first resistance value and the second resistance value.

Clause 23. The vaporizer according to clause 22, where the detection module includes:

a first voltage dividing unit, where a first end of the first voltage dividing unit is configured to input a set voltage, and a second end of the first voltage dividing unit is electrically connected to the first conductive port; and a second voltage dividing unit, where a first end of the second voltage dividing unit is configured to input a set voltage, and a second end of the second voltage dividing unit is electrically connected to the second conductive port; and the control module is connected to a first voltage dividing node of the first voltage dividing unit to acquire the first electrical signal, and the control module is connected to a second voltage dividing node of the second voltage dividing unit to acquire the second electrical signal.

Clause 24. The vaporizer according to clause 23, where the detection module further includes:

a first voltage follower, where an input end of the first voltage follower is connected to the first voltage dividing node, and an output end of the first voltage follower is connected to the control module; and a second voltage follower, where an input end of the second voltage follower is connected to the second voltage dividing node, and an output end of the second voltage follower is connected to the control module.

Clause 25. The vaporizer according to clause 23, where the detection module further includes:

a switching unit, where an input end of the switching unit is configured to input the set voltage, an output end of the switching unit is connected to the first end of the first voltage dividing unit and the first end of the second voltage dividing unit, and a control end of the switching unit is connected to the control module, where the control module turns on the switching unit when the remaining volume of the to-be-vaporized liquid is detected.

Clause 26. The vaporizer according to clause 22, where a first liquid level height corresponding to the first conductive port is greater than a second liquid level height corresponding to the second conductive port;

the control module is particularly configured to determine the remaining volume of the to-be-vaporized liquid to be zero, namely no oil when the first resistance value and the second resistance value are both greater than or equal to the preset threshold; or the control module is particularly configured to determine the remaining volume of the to-be-vaporized liquid to be half, namely half oil when the first resistance value is greater than or equal to the preset threshold and the second resistance value is less than the preset threshold; or the control module is particularly configured to determine the remaining volume of the to-be-vaporized liquid to be full, namely full oil when the first resistance value and the second resistance value are both less than the preset threshold.

Clause 27. A battery assembly, including:

the liquid storage assembly according to any one of clauses 14 to 20; and a battery configured to supply power to a vaporizer.

Clause 28. The battery assembly according to clause 27, where the liquid storage assembly is the liquid storage assembly according to clause 14 or 15; and the battery assembly further includes a detection circuit, and the detection circuit includes:

a detection module, electrically connected to the first conductive port and the second conductive port, and configured to acquire a first electrical signal by detecting the first conductive port, and acquire a second electrical signal by detecting the second conductive port; and a control module, connected to the detection module, and configured to determine a first resistance value of the to-be-vaporized liquid according to the first electrical signal, determine a second resistance value of the to-be-vaporized liquid according to the second electrical signal, and determine the remaining volume of the to-be-vaporized liquid according to the first resistance value and the second resistance value.

Clause 29. The battery assembly according to clause 28, where the detection module includes:

a first voltage dividing unit, where a first end of the first voltage dividing unit is configured to input a set voltage, and a second end of the first voltage dividing unit is electrically connected to the first conductive port; and a second voltage dividing unit, where a first end of the second voltage dividing unit is configured to input a set voltage, and a second end of the second voltage dividing unit is electrically connected to the second conductive port; and the control module is connected to a first voltage dividing node of the first voltage dividing unit to acquire the first electrical signal, and the control module is connected to a second voltage dividing node of the second voltage dividing unit to acquire the second electrical signal.

Clause 30. The battery assembly according to clause 29, where the detection module further includes:

a first voltage follower, where an input end of the first voltage follower is connected to the first voltage dividing node, and an output end of the first voltage follower is connected to the control module; and a second voltage follower, where an input end of the second voltage follower is connected to the second voltage dividing node, and an output end of the second voltage follower is connected to the control module.

Clause 31. The battery assembly according to clause 29, where the detection module further includes:

a switching unit, where an input end of the switching unit is configured to input the set voltage, an output end of the switching unit is connected to the first end of the first voltage dividing unit and the first end of the second voltage dividing unit, and a control end of the switching unit is connected to the control module, where the control module turns on the switching unit when the remaining volume of the to-be-vaporized liquid is detected.

Clause 32. The battery assembly according to clause 28, where a first liquid level height corresponding to the first conductive port is greater than a second liquid level height corresponding to the second conductive port;

the control module is particularly configured to determine the remaining volume of the to-be-vaporized liquid to be zero, namely no oil when the first resistance value and the second resistance value are both greater than or equal to the preset threshold; or the control module is particularly configured to determine the remaining volume of the to-be-vaporized liquid to be half, namely half oil when the first resistance value is greater than or equal to the preset threshold and the second resistance value is less than the preset threshold; or the control module is particularly configured to determine the remaining volume of the to-be-vaporized liquid to be full, namely full oil when the first resistance value and the second resistance value are both less than the preset threshold.

Clause 33. An electronic vaporization apparatus, including:

the liquid storage assembly according to any one of clauses 14 to 21; and a vaporization module, configured to vaporize to-be-vaporized liquid in the liquid storage cavity; and a battery, configured to supply power to the liquid storage assembly and the vaporization module.

clause 34. The electronic vaporization apparatus according to clause 33, where the liquid storage assembly is the liquid storage assembly according to any one of clauses 1 or 2; the electronic vaporization apparatus further includes a detection circuit, and the detection circuit includes:

a detection module, electrically connected to the first conductive port and the second conductive port, and configured to acquire a first electrical signal by detecting the first conductive port, and acquire a second electrical signal by detecting the second conductive port; and a control module, connected to the detection module, and configured to determine a first resistance value of the to-be-vaporized liquid according to the first electrical signal, determine a second resistance value of the to-be-vaporized liquid according to the second electrical signal, and determine the remaining volume of the to-be-vaporized liquid according to the first resistance value and the second resistance value.

Clause 35. The electronic vaporization apparatus according to clause 34, where a first liquid level height corresponding to the first conductive port is greater than a second liquid level height corresponding to the second conductive port; and the control module is configured to:

determine the remaining volume of the to-be-vaporized liquid to be zero, namely no oil when both the first resistance value and the second resistance value are greater than or equal to a preset threshold;

determine the remaining volume of the to-be-vaporized liquid to be half oil when the first resistance value is greater than or equal to the preset threshold and the second resistance value is less than the preset threshold; or determine the remaining volume of the to-be-vaporized liquid to be full oil when both the first resistance value and the second resistance value are less than the preset threshold.

Clause 36. a remaining volume detection method for detecting a remaining volume of to-be-vaporized liquid, including:

acquiring a first electrical signal of a first conductive port and a second electrical signal of a second conductive port;

determining a first resistance value of the to-be-vaporized liquid according to the first electrical signal and determining a second resistance value of the to-be-vaporized liquid according to the second electrical signal; and determining the remaining volume of the to-be-vaporized liquid according to the first resistance value and the second resistance value.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A liquid storage assembly, comprising:

a liquid storage cavity configured to store to-be-vaporized liquid;

a reference element at least partially located in the liquid storage cavity and comprising a reference electrode;

at least one detection element at least partially located in the liquid storage cavity, the at least one detection element being spaced apart from the reference element and comprising a detection electrode; and a detection circuit electrically connected to the reference element and the at least one detection element, the detection circuit being configured to detect capacitance between the reference element and the at least one detection element or resistance of the to-be-vaporized liquid, and to determine a remaining volume of the to-be-vaporized liquid according to the detected capacitance or resistance, wherein the reference element is configured as a heating element.

2. The liquid storage assembly of claim 1, wherein the at least one detection element comprises a first detection element and a second detection element, the reference element, the first detection element, and the second detection element all being completely located in the liquid storage cavity, the first detection element and the reference element forming a first capacitor, the second detection element and the reference element forming a second capacitor, and a distance between a bottom of the first detection element and a bottom of the liquid storage cavity being less than a distance between a bottom of the second detection element and the bottom of the liquid storage cavity, and wherein the detection circuit comprises:

a capacitance acquisition module connected to the reference element, the first detection element, and the second detection element, the capacitance acquisition module being configured to acquire capacitance of the first capacitor, output a first electrical signal corresponding to the capacitance of the first capacitor, acquire capacitance of the second capacitor, and output a second electrical signal corresponding to the capacitance of the second capacitor; and a processing module connected to the capacitance acquisition module, the processing module being configured to receive the first electrical signal and the second electrical signal, and to determine a remaining volume of the to-be-vaporized liquid of the first electrical signal and the second electrical signal.

3. The liquid storage assembly of claim 2, wherein the remaining volume of the to-be-vaporized liquid comprises a first remaining volume, a second remaining volume, and a third remaining volume, wherein the processing module is further configured to:

determine the remaining volume of the to-be-vaporized liquid to be the first remaining volume when a voltage of the first electrical signal is equal to a first voltage threshold and a voltage of the second electrical signal is equal to a second voltage threshold, wherein the first voltage threshold is a corresponding voltage of the first electrical signal when the first detection element is not in contact with the to-be-vaporized liquid in the liquid storage cavity, and the second voltage threshold is a corresponding voltage of the second electrical signal when the second detection element is not in contact with the to-be-vaporized liquid in the liquid storage cavity, wherein the processing module is configured to determine the remaining volume of the to-be-vaporized liquid to be the second remaining volume when the voltage of the first electrical signal is greater than the first voltage threshold and the voltage of the second electrical signal is equal to the second voltage threshold and wherein the processing module is configured to determine the remaining volume of the to-be-vaporized liquid to be the third remaining volume when the voltage of the first electrical signal is greater than the first voltage threshold and the voltage of the second electrical signal is greater than the second voltage threshold.

4. The liquid storage assembly of claim 2, wherein the capacitance acquisition module comprises:

a first capacitor acquisition unit connected to the first detection element, the reference element, and the processing module, and being configured to acquire a capacitance of the first capacitor and output the first electrical signal to the processing module; and a second capacitor acquisition unit connected to the second detection element, the reference element, and the processing module, and being configured to acquire a capacitance of the second capacitor and output the second electrical signal to the processing module.

5. The liquid storage assembly of claim 1, wherein the detection element comprises a first conductive port used as the detection electrode, the first conductive port being located in the liquid storage cavity, wherein the reference element comprises a second conductive port used as the reference electrode, the second conductive port being located in the liquid storage cavity, and wherein the detection element and the reference element extend into the liquid storage cavity from one side of the liquid storage cavity, the first conductive port and the second conductive port correspond to different liquid level heights, the first conductive port and the second conductive port are electrically connected to a detection circuit for the detection circuit to detect a resistance value of the to-be-vaporized liquid through the first conductive port and the second conductive port, to determine the remaining volume of the to-be-vaporized liquid.

6. The liquid storage assembly of claim 5, wherein a side surface of the detection element is insulated, and an end surface of one port of the detection element is conductive to form the first conductive port, and wherein a side surface of the reference element is insulated, and an end surface of one port of the reference element is conductive to form the second conductive port.

7. The liquid storage assembly of claim 6, wherein an entire outer surface of the detection element aside from the first conductive port is insulated, the first conductive port being arranged at an end of the detection element furthest from the side of the liquid storage cavity from which the detection element extends, and wherein an entire outer surface of the reference element aside from the second conductive port is insulated, the second conductive port being arranged at an end of the reference element furthest from the side of the liquid storage cavity from which the reference element extends.

8. The liquid storage assembly of claim 5, wherein the detection circuit comprises:

a detection module electrically connected to the first conductive port and the second conductive port, the detection module being configured to acquire a first electrical signal by detecting the first conductive port, and acquire a second electrical signal by detecting the second conductive port; and a control module connected to the detection module, the control module being configured to determine a first resistance value of the to-be-vaporized liquid of the first electrical signal, determine a second resistance value of the to-be-vaporized liquid of the second electrical signal, and determine the remaining volume of the to-be-vaporized liquid according to the first resistance value and the second resistance value.

9. The liquid storage assembly of claim 8, wherein the detection module comprises:

a first voltage dividing unit, a first end of the first voltage dividing unit being configured to input a set voltage, and a second end of the first voltage dividing unit being electrically connected to the first conductive port; and a second voltage dividing unit, a first end of the second voltage dividing unit being configured to input the set voltage, and a second end of the second voltage dividing unit being electrically connected to the second conductive port, wherein the control module is connected to a first voltage dividing node of the first voltage dividing unit to acquire the first electrical signal, and the control module is connected to a second voltage dividing node of the second voltage dividing unit to acquire the second electrical signal.

10. The liquid storage assembly of claim 9, wherein the detection module further comprises:

a first voltage follower, an input end of the first voltage follower being connected to the first voltage dividing node, and an output end of the first voltage follower being connected to the control module; and a second voltage follower, an input end of the second voltage follower being connected to the second voltage dividing node, and an output end of the second voltage follower being connected to the control module.

11. The liquid storage assembly of claim 8, wherein a first liquid level height corresponding to the first conductive port is greater than a second liquid level height corresponding to the second conductive port, wherein the remaining volume of the to-be-vaporized liquid comprises a first remaining volume, a second remaining volume, and a third remaining volume, and wherein the control module is configured to:

determine the remaining volume of the to-be-vaporized liquid to be the first remaining volume when both the first resistance value and the second resistance value are greater than or equal to a preset threshold, determine the remaining volume of the to-be-vaporized liquid to be the second remaining volume when the first resistance value is greater than or equal to the preset threshold and the second resistance value is less than the preset threshold, and determine the remaining volume of the to-be-vaporized liquid to be the third remaining volume when both the first resistance value and the second resistance value are less than the preset threshold.

12. An electronic vaporization apparatus, comprising:

the liquid storage assembly of claim 1;

a vaporization module configured to vaporize the to-be-vaporized liquid stored in the liquid storage cavity; and a power supply module configured to supply power to the liquid storage assembly and the vaporization module.

13. The liquid storage assembly of claim 1, wherein the reference element is configured to heat and vaporize the to-be-vaporized liquid in the liquid storage cavity.

14. A remaining volume detection method for to-be-vaporized liquid, applicable to an electronic vaporization apparatus comprising a liquid storage cavity, the liquid storage cavity being configured to store to-be-vaporized liquid, the remaining volume detection method comprising:

detecting capacitance between a reference element and at least one detection element as detected capacitance or resistance of the to-be-vaporized liquid;

wherein the reference element is at least partially located in the liquid storage cavity and comprises a reference electrode, and wherein the reference element is configured as a heating element;

wherein the at least one detection element is at least partially located in the liquid storage cavity, the at least one detection element is-being spaced apart from the reference element and comprising a detection electrode; and determining a remaining volume of the to-be-vaporized liquid according to the detected capacitance or resistance.

15. The remaining volume detection method of claim 14, wherein the at least one detection element comprises a first detection element and a second detection element, the reference element, the first detection element, and the second detection element all being completely located in the liquid storage cavity, the first detection element and the reference element forming a first capacitor, the second detection element and the reference element forming a second capacitor, and a distance between a bottom of the first detection element and a bottom of the liquid storage cavity being less than a distance between a bottom of the second detection element and a bottom of the liquid storage cavity, wherein detecting capacitance between the reference element and the at least one detection element comprises:

acquiring capacitance of the first capacitor, outputting a first electrical signal corresponding to the capacitance of the first capacitor, acquiring capacitance of the second capacitor, and outputting a second electrical signal corresponding to the capacitance of the second capacitor, and wherein determining a remaining volume of the to-be-vaporized liquid according to the detected capacitance comprises: determining the remaining volume of the to-be-vaporized liquid in the liquid storage cavity according to the first electrical signal and the second electrical signal.

16. The remaining volume detection method of claim 15, wherein the remaining volume of the to-be-vaporized liquid comprises a first remaining volume, a second remaining volume, and a third remaining volume, and wherein determining the remaining volume of the to-be-vaporized liquid in the liquid storage cavity according to the first electrical signal and the second electrical signal comprises:

determining the remaining volume of the to-be-vaporized liquid to be the first remaining volume when a voltage of the first electrical signal is equal to a first voltage threshold and a voltage of the second electrical signal is equal to a second voltage threshold, the first voltage threshold being a corresponding voltage of the first electrical signal when the first detection element is not in contact with the to-be-vaporized liquid in the liquid storage cavity, and the second voltage threshold being a corresponding voltage of the second electrical signal when the second detection element is not in contact with the to-be-vaporized liquid in the liquid storage cavity, determining the remaining volume of the to-be-vaporized liquid to be the second remaining volume when the voltage of the first electrical signal is greater than the first voltage threshold and the voltage of the second electrical signal is equal to the second voltage threshold, and determining the remaining volume of the to-be-vaporized liquid to be the third remaining volume when the voltage of the first electrical signal is greater than the first voltage threshold and the voltage of the second electrical signal is greater than the second voltage threshold.

17. The remaining volume detection method of claim 14, wherein the detection element comprises a first conductive port used as the detection electrode, the first conductive port being located in the liquid storage cavity, and the reference element comprises a second conductive port used as the reference electrode, the second conductive port being located in the liquid storage cavity;

wherein detecting resistance of the to-be-vaporized liquid comprises:

acquiring a first electrical signal of the first conductive port and acquiring a second electrical signal of the second conductive port, and determining a first resistance value of the to-be-vaporized liquid according to the first electrical signal, and determining a second resistance value of the to-be-vaporized liquid according to the second electrical signal, and wherein determining a remaining volume of the to-be-vaporized liquid according to the detected resistance comprises:

determining the remaining volume of the to-be-vaporized liquid according to the first resistance value and the second resistance value.

* * * * *